US012617423B2

(12) United States Patent
Doken

(10) Patent No.: US 12,617,423 B2
(45) Date of Patent: May 5, 2026

(54) SYSTEM AND METHOD OF DRIVER ASSISTANCE FOR PREDICTIVE NAVIGATION

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 197 days.

(21) Appl. No.: 18/236,106

(22) Filed: Aug. 21, 2023

(65) Prior Publication Data

US 2025/0065903 A1    Feb. 27, 2025

(51) Int. Cl.
| | |
|---|---|
| *B60W 60/00* | (2020.01) |
| *G01C 21/36* | (2006.01) |
| *G06Q 50/40* | (2024.01) |

(52) U.S. Cl.
CPC ....... B60W 60/001 (2020.02); G01C 21/3626 (2013.01); *B60W 2420/403* (2013.01); *B60W 2554/80* (2020.02); *B60W 2556/50* (2020.02); *G06Q 50/40* (2024.01)

(58) Field of Classification Search
CPC ........... B60W 60/001; B60W 60/0027; B60W 50/08; B60W 50/14; B60W 2050/146; B60W 2420/403; B60W 2420/408; B60W 2554/40; B60W 2554/80; B60W 2554/4045; B60W 2556/45; B60W 2556/50; B60W 2556/65; G08G 1/0962; G08G 1/0965; G08G 1/0968; G08G 1/096861; G08G 1/096866; G08G 1/0969; G05D 1/0214; G05D 1/0223;

G05D 1/0278; G05D 1/0289; G01C 21/34; G01C 21/3626; G01C 21/3632; G01C 21/3664; G06Q 50/40
See application file for complete search history.

(56) References Cited

U.S. PATENT DOCUMENTS

| | | | | |
|---|---|---|---|---|
| 9,666,079 | B2 * | 5/2017 | Lokesh ................. | B60W 30/16 |
| 10,475,143 | B1 | 11/2019 | Hayes et al. | |
| 2010/0253593 | A1 * | 10/2010 | Seder ...................... | G01S 17/86 |
| | | | | 701/31.4 |
| 2017/0236415 | A1 * | 8/2017 | Okabe .................... | G08G 1/127 |
| | | | | 701/117 |
| 2021/0031758 | A1 * | 2/2021 | Urano ............... | B60W 30/0956 |
| 2022/0144273 | A1 * | 5/2022 | Yamaguchi ..... | B60W 60/00276 |
| 2022/0161830 | A1 * | 5/2022 | Devassy ........... | B60W 50/0097 |
| 2023/0391374 | A1 * | 12/2023 | Chen ...................... | G06N 3/088 |

OTHER PUBLICATIONS

"All Tesla FSD Visualizations and What They Mean," not a tesla app, https://www.notateslaapp.com/tesla-reference/636/all-tesla-fsd-visualizations-and-what-they-mean (2021).
"Study Reveals Where Drivers Are Most Reliant on Their GPS," unitedtires library, https://www.utires.com/articles/where-drivers-need-gps-the-most/.

* cited by examiner

*Primary Examiner* — Brandon Z Willis
(74) *Attorney, Agent, or Firm* — HG LAW LLP

(57) ABSTRACT

Systems and methods are described for enabling a first vehicle to receive navigational information about the next navigational steps for one or more nearby vehicles. The first vehicle is identified, and one or more nearby vehicles are determined. The next navigational step for each of the nearby vehicles is determined, and provided to the first vehicle. The first vehicle then presents an indication of the next navigational steps for each of the nearby vehicles.

20 Claims, 13 Drawing Sheets

SYSTEM AND METHOD OF DRIVER ASSISTANCE FOR PREDICTIVE NAVIGATION

BACKGROUND

The present disclosure relates to methods and systems for enabling a requesting vehicle navigation client to request and receive navigation information about nearby vehicles and their predicted upcoming actions. In an embodiment, the nearby vehicle navigation information is presented on a user interface to a user of the requesting vehicle navigation client. Some embodiments may relate to other features, functionalities, or fields.

SUMMARY

Navigation mapping systems enable users to navigate through unfamiliar areas as well as to find optimal routes to minimize encounters with congestion, traffic, accidents, construction, closures, and more. Navigation systems typically determine a location of, e.g., a vehicle, a smartphone, and/or other network connected device to provide real-time directions, and these systems also typically offer predictive functionalities such as predicting locations that have heavy traffic, estimating arrival times, and/or offering "community-based" collaborative features such as identifying the locations of police speed traps or foreign objects on the road, when they are spotted and reported by other users in the community.

Despite progress in vehicle navigation, existing navigation systems are still generally unable to determine, for a given vehicle, what actions the surrounding vehicles are likely to take, as well as when each action may be likely taken. That is, existing systems generally cannot enable a user of one vehicle to reliably determine when one or more nearby vehicles are going to change lanes, take an exit, make a turn, speed up, slow down, or take some other navigational action.

Most current vehicles and vehicle users operate essentially blind to the upcoming actions of other vehicles beyond what is immediately visible. That is, the only information a given vehicle or vehicle user can use in making navigation decisions is whether another vehicle has activated a turn signal or has already begun the action by beginning to turn the vehicle. Turn signals, however, are prone to user error. In some cases, a vehicle's turn signal may be broken and/or may not operate at all. In other cases where the turn signal is operational, a user may decide to use the turn signal intermittently or not at all. Further, a small minority of drivers' signals may be outright wrong (e.g., signal left and turn right). And even in situations where turn signals are used properly, the signal may be occluded or obstructed from view for many drivers, and/or may be missed due to early/late timing of when the turn signal is activated. Furthermore, in some urban settings where there are multiple roads or side streets in close proximity, a properly used turn signal may not convey which road the vehicle is going to turn on.

In some approaches, a vehicle may use a sensor or sensor suite (e.g., LIDAR or other imaging) to identify and track nearby vehicles, pedestrians, and/or traffic infrastructure like stop signs and traffic lights. This information may be used by the vehicle to steer and avoid collisions, particularly where the vehicle is autonomous or self-driving. Additionally, the vehicle screen or HUD may show a representation of the identified objects as the objects move relative to the vehicle.

However, these systems still generally fail to provide information about the predicted actions of other vehicles, and do not enable the vehicle to visualize the next movement nearby vehicles are likely to make.

In light of these problems, one solution may be to share navigational data between vehicles using vehicle-to-vehicle (V2V) communication. However, this solution brings its own challenges due to the high bandwidth requirements, as well as privacy concerns. Many users may be uncomfortable sharing their starting point, destination, and/or other navigational information with the vehicles nearby.

In another approach, several vehicles sharing a path can communicate with each other to share information about what lies ahead, destination recommendations, and to reduce fuel consumption. However, these vehicles typically must share a particular route, and must query each other based on certain activities such as picking up gifts or details about errands.

As such, there exists a need for a navigational system that enables a vehicle user to identify the next navigational action other vehicles are likely to take, without requiring the vehicles to share the same destination, or even the same next turn. Information about the likely next actions of nearby vehicles can increase safety by enabling a vehicle user to take proactive movement before the nearby vehicles take their predicted actions.

Accordingly, methods and systems are disclosed herein for providing navigational information about nearby vehicles to enable a driver to visualize the predicted next action of the nearby vehicles and take proactive action. This predictive foresight can be helpful for some, if not all, drivers to make proactive decisions such as changing lanes (knowing that a vehicle will vacate a lane soon), accelerating or decelerating based on predictive knowledge of another vehicle's movement, or positioning their vehicle ahead of time to take a turn, ramp, exit or line up. Having this predictive knowledge about other vehicles' likely next actions, some drivers may even decide to try a different route to avoid bottleneck situations. Additionally, predictive knowledge about other vehicle's likely next actions can improve driving safety, particularly in situations such as where a driver needs to cut in due to leaving their HOV Lane for an exit, or changes lanes from the most left to the most right (or vice versa) in order to make their exit. Providing a user with predictive knowledge about nearby vehicle's likely next action can help them to be on guard to deal with those abrupt, unexpected, or dangerous driving behaviors.

In some examples, vehicles may operate using a mapping system such as Apple Maps or Google Maps. These vehicles may communicate with a navigation server, which stores information about the vehicles' routes. A user vehicle may request information about nearby vehicles from the navigation server. The navigation server may then sort or filter the stored information to determine which vehicles are nearby or relevant to the user vehicle, and may then deliver the relevant information to the user vehicle. The user vehicle may then present the relevant information via a suitable user interface.

In some examples, the user vehicle may request information about all nearby vehicles, based on the location (e.g., GPS location) of the user vehicle. The navigation server may identify all other vehicles within a particular range of the user vehicle, and deliver the relevant information to the user vehicle. In other examples, the navigation server may filter based on the direction of the user vehicle's movement, so as to only include information about vehicles driving in the same direction. The navigation server may also filter based on various other criteria, such as only those vehicles that share a next waypoint with the user vehicle, only those vehicles that are travelling at a certain speed, only those vehicles having a turn as the next waypoint, and more.

In some examples, the user vehicle may request information about a specific nearby vehicle or set of vehicles. For example, the user may define a waypoint, range, or area on a map (e.g., by drawing on, selecting, or touching a user interface displaying the map) for which the user wants information about other vehicles. The navigation server may identify vehicles that meet these user-selected criteria, and deliver the relevant information. Alternatively, the user vehicle itself may include sensors that can be used to identify a vehicle (e.g., vehicle cameras, LIDAR, radar, ultrasound, etc.). The navigation server can then filter the data to determine what information corresponds to the vehicle identified by the user vehicle sensors, and return the relevant information.

The user vehicle may then present the received information from the navigation server on a user interface. For example, the user interface may include a visualization of each relevant nearby vehicle overlaid on a map, along with the expected route of each vehicle (e.g., a line extending from the nearby vehicle to the nearby vehicle's next waypoint). In other examples, the user interface may include a visualization of each nearby vehicle along with an arrow overlaid on the vehicle indicating the vehicle's likely next movement (e.g., straight arrow, turning arrow). In still other examples, the user interface may include a map showing the user vehicle's current location, along with arrows indicating left turn, straight, and right turn, along with a corresponding aggregate number of vehicles taking each path. This may be useful when the user vehicle is at or approaching an intersection with many vehicles, to indicate in general terms how many vehicles will be turning or going straight through the intersection.

In some examples, the systems and methods described herein may be used in connection with a self-driving vehicle. The self-driving vehicle may alter its driving behavior based on the predicted movements of nearby vehicles received from the navigation server. For example, the self-driving vehicle may change its speed to adjust for predicted movements of other vehicles, change lanes to take advantage of other vehicles changing lanes or taking an exit, or otherwise adjust its behavior in response to the received information.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 4A-B illustrate example displays showing a first vehicle and a nearby vehicle, along with the nearby vehicle's predicted next navigational step (FIG. 4A) and predicted next two navigational steps (FIG. 4B), in accordance with some examples of the disclosure;

DETAILED DESCRIPTION

Figure 1:
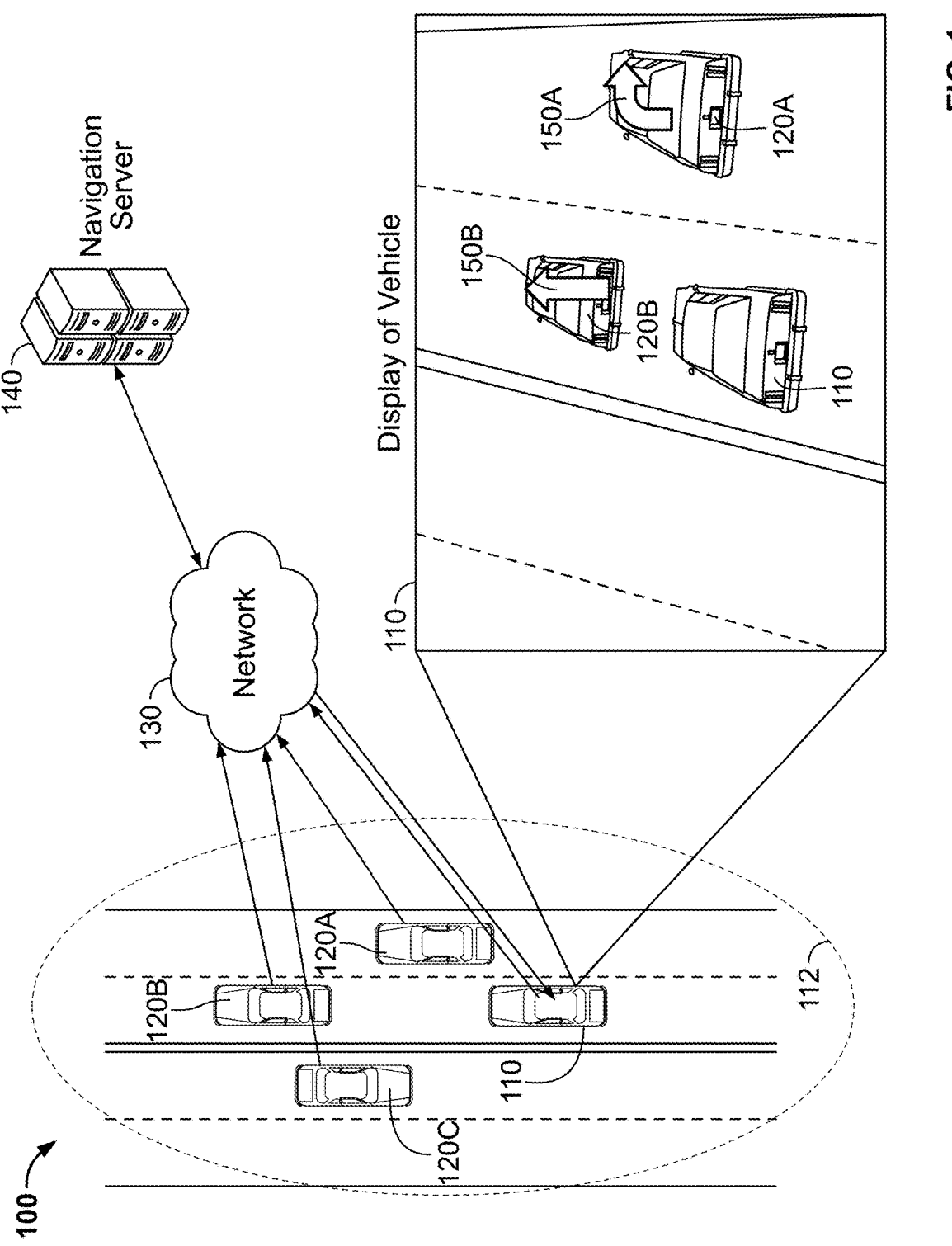
FIG. 1 illustrates an example scenario in which a first vehicle requests and receives navigational information about nearby vehicles, in accordance with some examples of the disclosure.

As noted above, providing navigation information about the predicted next navigational steps for nearby vehicles to a first vehicle can improve safety and enable the first vehicle operator to take preemptive action to avoid accidents, reach a destination more quickly, and to generally improve overall driving conditions. Studies have shown that more than 50% of people drive using GPS navigation. Additionally, despite the promise of vehicle to vehicle (V2V) communication, in which vehicles communicate with each other using short range spectrum such as a 5.9 Ghz channel, this technology has been very slow in getting deployed on OEM vehicles. In fact, it is questionable whether V2V technology will ever get deployed pervasively despite the effort during the last 15 years. OEMs are generally hesitant due to not having a good business case despite the cost, and some cities and town balk at the cost of roadside unit (RSU) installation.

With the above noted issues in mind, example methods and systems described herein propose techniques where navigation information communicated by each vehicle mapping client to a navigation server (or set of servers) is sorted/filtered and delivered back to requesting vehicle mapping clients, so that the requesting clients can visualize what the most immediate upcoming navigation moves of the vehicles in their vicinity are going to be.

Some examples disclosed herein include a prerequisite that each of the vehicles are navigating using the same navigation system (e.g., Apple Maps or Google Maps), that the navigation systems used are interoperable or can communicate with each other, and that the drivers of the vehicles are obeying the navigation instructions they are provided. It is also assumed in some examples that the communication links or channels (i.e., between the vehicle navigation clients and the navigation server) operate with low latency, or with a latency similar to that used for existing digital map-based navigation.

As used herein, the terms "navigational step", "navigational waypoint," "step," "waypoint," "direction," "instruction," "path," "route," and "turn" may be used interchangeably. Each term may refer to the navigation instructions provided to a given vehicle.

Additionally, as used herein, the term "next" navigational step, waypoint, instruction, etc. may refer to the immediate next step (e.g., continue on current road, move to left 2 lanes, make turn at the next intersection, etc.), or may refer to a future step that the target vehicle is expected to make, and which is not the immediate next step. That is, the next navigational step may refer to the next expected turn, even if the next turn is step three (with step one being maintain course for 2.5 miles, and step two being enter right lane, for example). The next navigational step may refer to a future step that the target vehicle is predicted to make, and which is relevant to the first vehicle. Relevance may refer to target vehicle navigational steps which cause the target vehicle to change lanes, change speeds, turn, or otherwise prompt the first vehicle to make a driving adjustment if the first vehicle is driving nearby to the target vehicle.

Furthermore, in examples of this disclosure that refer to a vehicle taking an action (e.g., the first vehicle 110 requests navigational information from the navigation server 140), it should be appreciated that this may include a system or device associated with the vehicle performing the action. That is, a navigation application corresponding to the vehicle, such as an application running on the vehicle or on a smartphone of a user in the vehicle, may perform the functions described herein instead of or in addition to the vehicle itself. For simplicity, the examples described herein may simply refer to "the vehicle" performing the functions.

FIG. 1 illustrates an example scenario 100 in which a first vehicle 110 requests information about nearby vehicles from a navigation server 140. The first vehicle 110 may be operating using a navigation client (e.g., Apple Maps), and the navigation server 140 from which the first vehicle requests the information about the nearby vehicles may be the same server that provides the navigation instructions to the first vehicle navigation client.

In the illustrated example, the first vehicle 110 may request information about nearby vehicles that are within a boundary, such as boundary 112. The boundary 112 may be a physical boundary (as shown in FIG. 1), with a radius extending a distance from the first vehicle 110. The shape of the boundary may be any suitable shape, including a circle, oval, etc. The distance, shape, orientation, and/or other aspect of the boundary may be input via any suitable user interface (e.g., the user may input a distance, select a distance from preset options, provide a distance via text input, voice input, a default distance based on the first vehicle type, and/or various other input types. In some examples, the boundary distance may be based on a location of the first vehicle or a density of the area (e.g., operating in a rural area may use a larger distance than in an urban area). In still other examples, the boundary distance may be dynamically set so that only the closest N vehicles are included (e.g., closest 10 vehicles). The boundary may change over time based on the location, nearby vehicle density, and/or any other suitable information. In some examples, the boundary may be set by the first vehicle (or a navigation application associated with the vehicle), while in other examples the navigation server 140 may set the boundary 112.

In some examples, the boundary 112 may be drawn on a user interface. The first vehicle 110 may include a user interface configured to present a map on a display. A user of the first vehicle may then draw an outline of the boundary on the presented map.

In some examples, rather than defining a boundary 112, the request for information about nearby vehicles may include a request for information about a specific vehicle or set vehicles (e.g., by selection via a user interface). This is described in further detail below with respect to FIG. 9. In other examples, rather than selecting a physical boundary, the user may select a waypoint on the map, an intersection, a landmark, a rest stop, or some other point of interest or set of points on the map. The resulting "boundary" based on the user selection of a waypoint may then include the set of vehicles that share that same next waypoint, or are predicted to travel by, to, or through that waypoint. This concept is discussed in further detail below with respect to FIGS. 12A-12B.

Referring back to the example shown in FIG. 1, first vehicle 110 requests navigational information about nearby vehicles. The request may include the location of the first vehicle 110, along with an identifier of the boundary 112 (e.g., a distance or range from the location of the first vehicle). As shown, vehicles 120A, 120B, and 120C are located within the boundary 112. The first vehicle transmits the request to the navigation server 140 via a network 130. The network 130 may be any suitable wireless network.

Nearby vehicles 120A-C may also communicate with navigation server 140 via network 130 (or some other network). In some examples, the nearby vehicles 120A-C may also have received or may be receiving navigational instructions as they each travel to their respective destinations. That is, vehicles 110, 120A, 120B, and 120C may all be using same navigational system or may be using two or more systems that are interoperable and can communicate with each other (e.g., Google Maps. Apple Maps, etc.).

The navigation server 140 may comprise a single server, two or more servers, may comprise multiple servers corresponding to different mapping systems, may be distributed across multiple physical locations, and/or may include circuitry to enable communication of various information with other systems or devices. The navigation server 140 may store information about the navigation instructions for one or more vehicles, including the first vehicle 110, as well as the nearby vehicles 120A-C. The navigation server 140 may also store information about each of the vehicles, including vehicle type (e.g., make, model, color, etc.), current location, navigation history (e.g., to determine a likelihood that a given vehicle will follow navigation instructions it is provided in the future), and more.

The navigation server 140 may filter the stored information about the vehicles in order to identify the vehicles 120A, 120B, 120C in response to receiving the request for information from the first vehicle 110. The navigation server 140 may have a database or other storage structure of all vehicles in the area of the first vehicle, which may include many vehicles that are not relevant to the first user's request. The navigation server 140 may filter out vehicles for which the navigational information is not relevant. For example, as illustrated in FIG. 1, the nearby vehicle 120C is travelling in the opposite direction from the first vehicle 110, and so the next navigational step for vehicle 120C may not be relevant to the first vehicle 110 because it is behind the first vehicle 110, and corresponds to a vehicle on the opposite side of the road.

The navigation server may filter out vehicles using various criteria. As a non-exhaustive list, some of the example criteria the navigation server 140 may use to filter out vehicles includes: (a) removing vehicles that are travelling in the opposite direction from the requesting vehicle, (b) removing vehicles that are outside the boundary, (c) removing vehicles that do not share a same next navigational step, (d) removing vehicles that are behind the requesting vehicle, (e) removing vehicles positioned behind the requesting vehicle that are moving at a slower speed than the requesting vehicle, (f) removing vehicles that are positioned in front of the requesting vehicle and are moving at a faster speed than the requesting vehicle, and (g) removing vehicles that have lower than a threshold probability of following the navigational instructions provided. With respect to criteria (g), some drivers may not follow navigational instructions very well. These drivers may take alternative routes than what is shown, or may simply ignore the provided instructions. If a target vehicle has navigation turned on, but the driver is not following the provided instructions, the navigation server 140 may decide that the target vehicle should be filtered out. The navigation server 140 may make this determination based on a navigation history of the target vehicle (i.e., how often the target vehicle has followed instructions in the past). The navigation server 140 may consider a full navigation history of the target vehicle, only a recent navigation history (e.g., last 10 trips, last 10 days, etc.), and/or only a navigation history in the geographic area in which the target vehicle is currently travelling. If the probability that the target vehicle will follow a next navigational step is less than a threshold, the navigation server 140 may determine that the target vehicle should be filtered out. As a result, the system 100 may instill confidence in a driver that the displayed upcoming actions of nearby vehicles are relatively likely to occur. Without such filtering, drivers may lose confidence in the reliability of the "upcoming actions of nearby vehicles" feature(s), thereby reducing the effectiveness of the feature(s).

In the example shown in FIG. 1, the navigation server 140 determines that vehicles 120A and 120B are relevant because they are travelling in the same direction as the first vehicle 110 and are within the boundary 112. The navigation server 140 then determines the next navigational step for each of vehicles 120A and 120B, and transmits that information to the first vehicle 110.

The vehicle 110 may then display the respective next navigational steps for vehicles 120A and 120B overlaid on the vehicles on a display, as shown in FIG. 1. Vehicle 120A is expected to turn right (step 150A) at the next intersection, and vehicle 120B is expected to go straight (step 150B). This visualization is for illustrative purposes only, and it should be appreciated that there are many other ways of visualizing the predicted next steps, instructions, or waypoints for nearby vehicles, as described below and illustrated with respect to the other FIGS. For example, FIGS. 3A, 3B, 4A, 4B, 5, 6, 7, 10, 11, 12A, and 12B illustrate example displays that a first vehicle may present to a user, illustrating the various features and visualizations disclosed herein.

In some examples, the vehicle 110 may include a display. The display may be a vehicle user interface, a center console display, a heads-up display (HUD), an augmented reality (AR) display, or any other suitable display. In an example, the visualizations described herein can be shown on an AR HUD (and/or on the mapping client display). When using the HUD, the predicted next steps of nearby vehicles may be overlaid directly on the corresponding vehicles by using the data collected using the first vehicle's cameras (or other sensors such as LIDAR, radar, ultrasound, mmW imaging, etc.) to identify the nearby vehicles corresponding to the received next navigational steps.

In some examples, the display may be part of a device coupled to first vehicle 110 (e.g., a phone or other display device plugged into the first vehicle 110 or communicatively coupled to the first vehicle 110). In this case, the first vehicle 110 may act as a bridge for communication between the navigation server 140 and the connected device (not shown).

Figure 2:
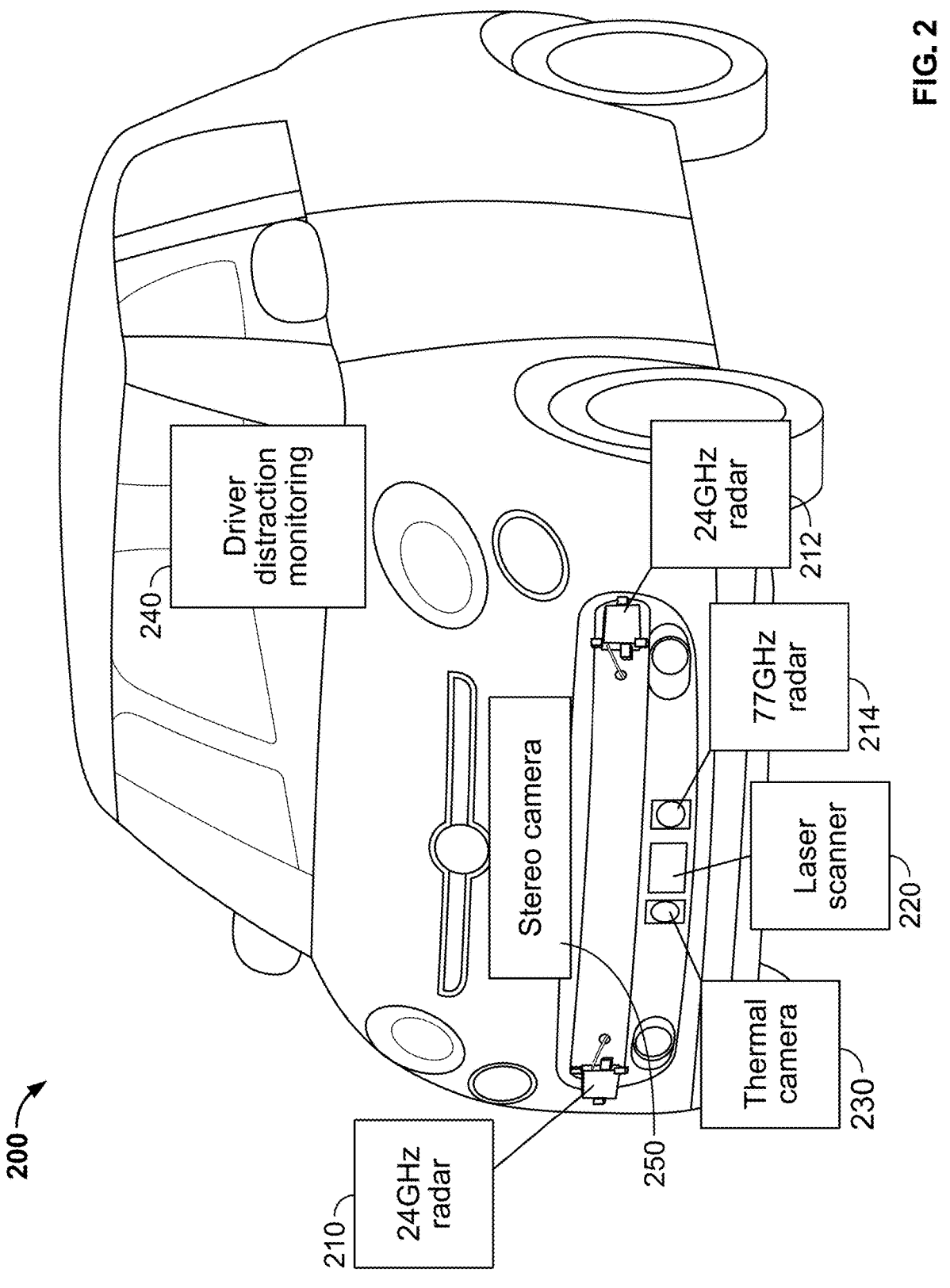
FIG. 2 illustrates an example vehicle and suite of sensors, in accordance with some examples of the disclosure.

FIG. 2 illustrates an example vehicle 200 having a set of sensors according to various examples of the present disclosure. The vehicle 200 may be a human driven vehicle, a self-driving or autonomous vehicle, and/or a vehicle which is configured to operate in one or more autonomous modes (e.g., with autonomous parking, lane change, etc.). The vehicle 200 includes a set of sensors including radars 210, 212, 214, a laser scanner 220, a thermal camera 230, a distracted driver monitoring system 240, and a stereo camera 250.

Cameras may be ubiquitously deployed in modern vehicles and can enable a variety of features such as lane departure warning, adaptive cruise control, following distance adjustment, etc. Furthermore, due to future expected roll-out of autonomous vehicles (and/or autonomous vehicle modes), it is expected that the number of cameras on vehicles will increase. For example, vehicles may include one or multiple cameras at each corner of the vehicle, a 360 degree camera on top, and a variety of other sensors such as LIDAR, radar, ultrasound etc. These cameras and other sensors may be used to analyze surroundings, identify nearby vehicles, pedestrians, obstructions, etc.

In some examples, as described in further detail below, sensor data may be used to detect the make, model, color, and/or other identifying information of nearby vehicles. This data may be sent to the navigation server 140, which may then identify the next navigational step for that vehicle based on the sensor data. Additionally, in some embodiments, the sensor data may be used to determine whether a given vehicle is likely to follow the next navigational instruction. For example, the distracted driver monitoring system 240 may be used to identify whether a driver is paying attention to the navigational instructions, and if the driver is distracted, the likelihood that the driver follows the next navigational instruction may be reduced. This information may be used by the navigation server to filter out vehicles that are not likely to follow the upcoming navigational instructions.

Figure 3B:
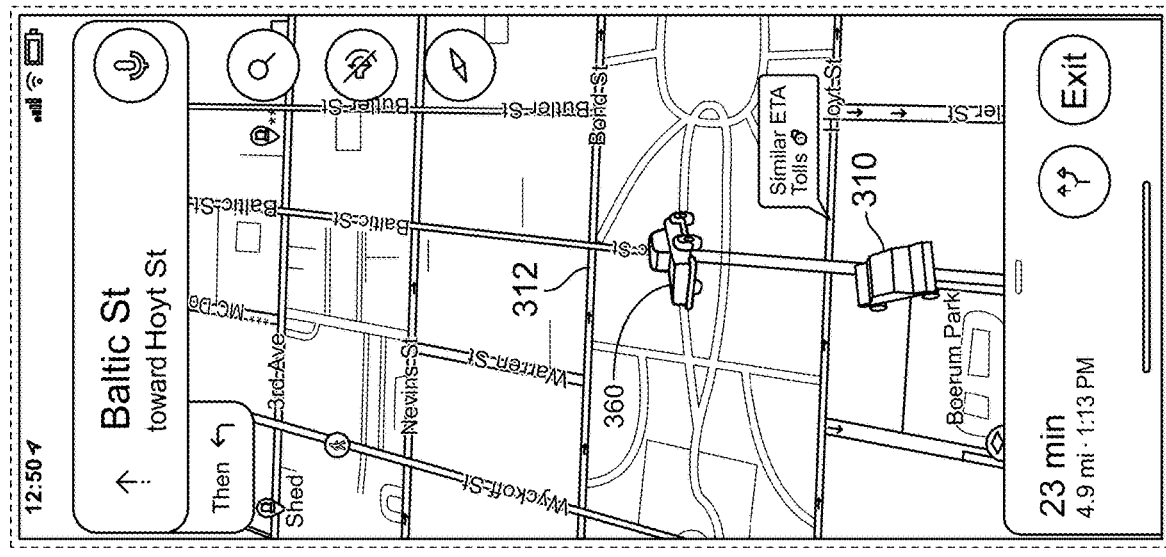
FIGS. 3A-B illustrate example displays showing a regular mode for vehicle navigation and an enhanced mode for vehicle navigation in which nearby vehicles are also displayed, in accordance with some examples of the disclosure.
Figure 3B:
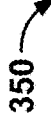
Figure 3A:
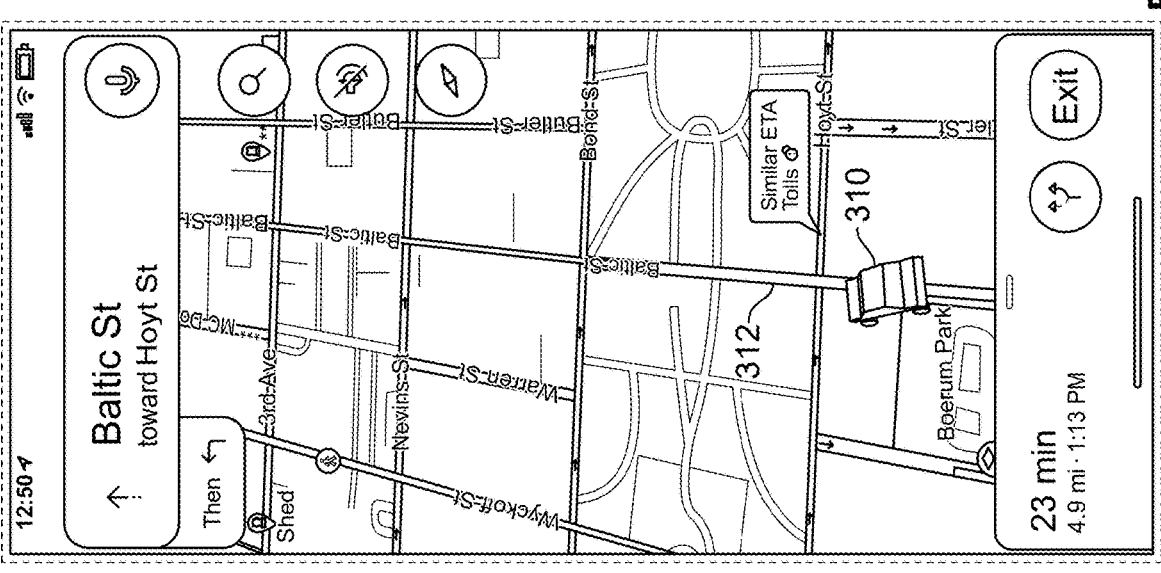
Figure 3A:

FIGS. 3A and 3B illustrate example displays according to embodiments of the present disclosure. In some examples, a navigation application carrying out the features and functions described herein may operate in two modes. In a first mode (e.g., regular or default) shown in FIG. 3A, the display 300 only shows the first vehicle 310, along with the navigation path 312 corresponding to the first vehicle 310. That is, in the first mode, the display only shows the vehicle to which the navigation application corresponds. In a second mode (e.g., enhanced, optional, or some other term) shown in FIG. 3B, the display 350 shows both the first vehicle 310 and the nearby vehicle 360, along with the first vehicle navigational path 312. That is, in the second mode, the display shows both the vehicle to which the navigation application corresponds as well as nearby vehicles. As indicated above with respect to FIG. 1, the set of vehicles shown in the second mode may be primarily focused on the vehicles generally travelling in the same direction, within a defined range, having a shared next waypoint, etc.

Figures 4A, 4B:
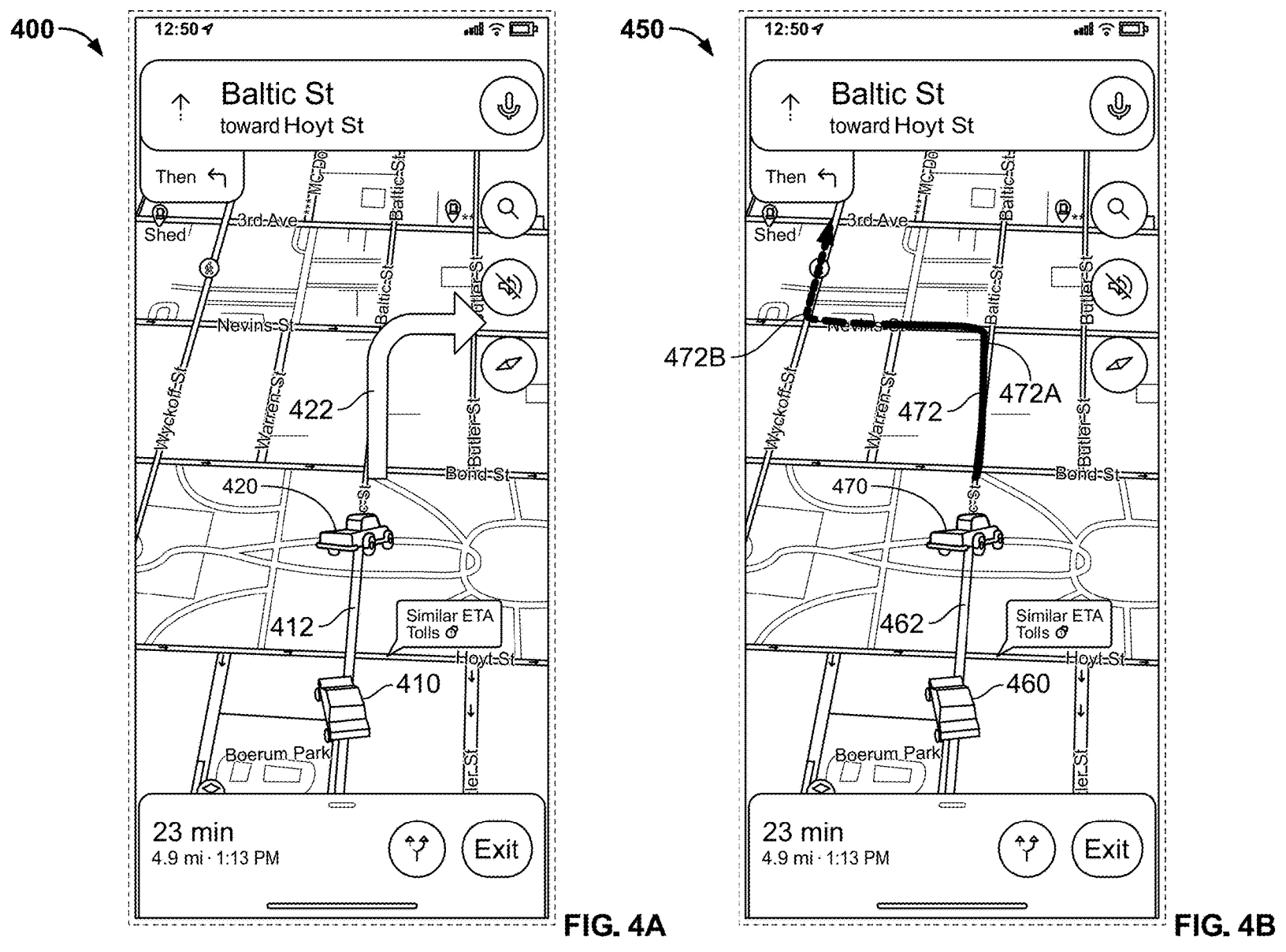

FIGS. 4A and 4B illustrate example displays 400 and 450. FIG. 4A illustrates a first vehicle 410 and a nearby vehicle 420, along with the first vehicle predicted path 412, and the nearby vehicle predicted next navigational step 422. FIG. 4B illustrates a first vehicle 460 having a first vehicle predicted path 462, as well as a nearby vehicle 470 having a predicted navigational path 472.

As each navigating vehicle mapping client reports their GPS location and speed to the navigation/mapping server (e.g., navigation server 140), the server will have a dynamic database of all the navigating vehicles in any given location. In some examples, the navigation server will filter that database based on the next waypoint navigation instruction (or one or more other criteria, as discussed herein), and only a subset of the vehicles such as those that have GPS location within a specific radius will remain. This set of vehicles will be further sorted based on the GPS location of the vehicles that are ahead of the first vehicle, travelling in the same direction as the first vehicle, or meet various other criteria. The navigation server will then send the next waypoint navigation data corresponding to the set of vehicles to the first vehicle.

FIG. 4A shows a display 400 presented to a user of the first vehicle 410, showing that the first vehicle 410 will see that another vehicle 420 is in the vicinity, travelling in the same direction. The navigational path 412 for the first vehicle is shown, in a first color, first type of dashed line, or in some other first type of visualization. The next navigation step 422 for the nearby vehicle 420 is a right turn on "Nevins St." The next navigation step 422 may be displayed in a second color, second type of dashed line, or other second type of visualization in order to differentiate from the first vehicle navigation path. In some examples, in addition to the visualization of the nearby vehicle 420's next step 422, an audio alert may also be used to alert the driver of the first vehicle 410 without requiring the driver's eyes to look at the screen, so as to minimize distractions.

FIG. 4B shows a display 450 presented to a user of the first vehicle 460, showing that the first vehicle 460 will see that another vehicle 470 is in the vicinity, travelling in the same direction. The upcoming navigational path 472 of the nearby vehicle 470 is also shown, which may include two or more navigational steps. The immediate next navigational step for the nearby vehicle 470 is a left turn on "Nevins St." (step 472A), followed by a right turn on "Wyckoff St" (step 472B). The display 450 may illustrate each of steps 472A and 472B (and/or other subsequent steps) differently, depending on how far off each step is expected to be. That is, the immediate next step 472A may be shown in a solid line, while the subsequent step 472B may be shown in a dashed line, to indicate that the subsequent step is further off, or is less certain. Other methods for displaying the next step or steps of the nearby vehicle 470 may be used instead or additionally, such as displaying the navigational path 472 in a color gradient, shading gradient, dashed gradient, or other visualization method to indicate to a viewer which steps of the path 472 are more immediate than others.

Figure 5:
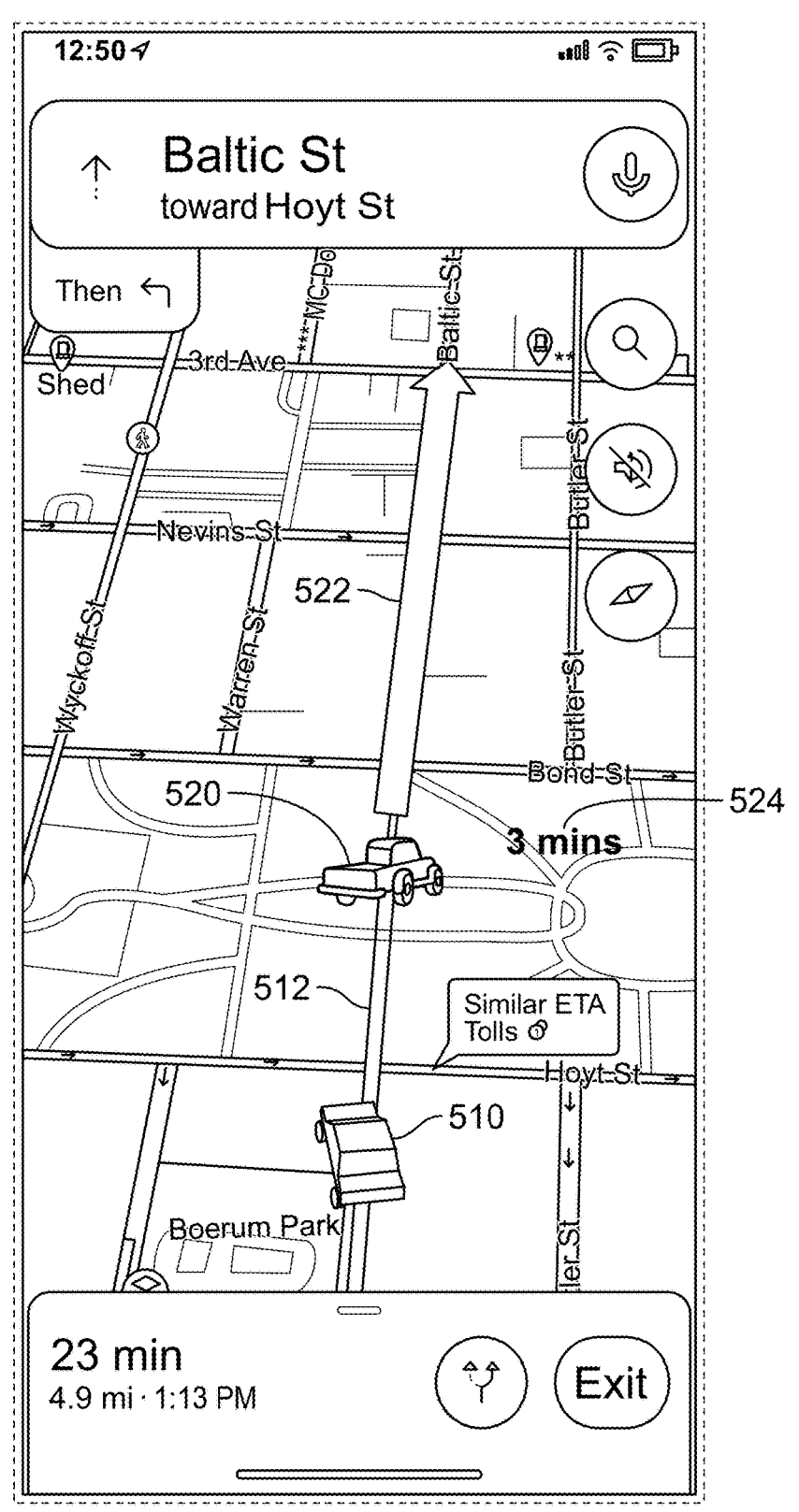
FIG. 5 illustrates an example display showing a first vehicle and a nearby vehicle, along with the nearby vehicle's predicted next navigational waypoint based on time, in accordance with some examples of the disclosure.

FIG. 5 illustrates an example display 500 showing a first vehicle 510 and a nearby vehicle 520. Display 500 also illustrates the first vehicle's route 512 and the nearby vehicle 520's predicted path 522 based on time, in accordance with some examples of the disclosure. The display 500 illustrates the predicted upcoming path 522 of the nearby vehicle 520 during the time indicated by the time indicator 524 (e.g., three mins). The time indicator 524 corresponds to the duration for which the nearby vehicle 520 is expected to continue along the upcoming path 522.

In some examples, rather than showing the nearby vehicle's next navigation instruction (e.g., an arrow), the display 500 may instead show when the neighboring vehicle is planning for the next waypoint move. With respect to FIG. 5, the time indicator 524 (i.e., 3 mins) may correspond to a countdown until the nearby vehicle 520 is expected to take a next turn or reach a next navigational waypoint. That is, the navigation server may determine the next waypoint or navigational step, (e.g., turn) that the nearby vehicle 520 is expected to take, along with the expected time when that waypoint will be reached. This info may then be transmitted to the first vehicle 510. If the nearby vehicle 520 is expected to turn right in four minutes, the display may instead indicate a right turn along with a time indicator of four minutes.

In some examples, the upcoming path 522 and time indicator 524 may illustrate the expected route that the nearby vehicle 520 is expected to take in duration of time indicated by the time indicator 524 (e.g., three min). That is, whatever time the time indicator 524 displays may enable the navigation server to project forward in time that amount, and return to the first vehicle the expected path that the nearby vehicle will take in that duration of time. If the time indicator is three minutes and the nearby vehicle is on a highway and has 12 miles to go until the next turn, the first vehicle may only receive information that the nearby vehicle 520 is expected to be on the highway for the next 3 minutes. In this example, the first vehicle 510 may not be given information about the next navigational step of the nearby vehicle 520 (e.g., the upcoming turn in 12 minutes) if it is expected to occur after the three minute time interval shown by the time indicator 524. FIG. 5 illustrates this example. This visualization option helps with the privacy concern of neighboring vehicles who do not want their waypoint moves to be known. By showing only the timer countdown of a neighboring vehicle, embodiments of this disclosure reduce privacy concerns.

Figure 6:
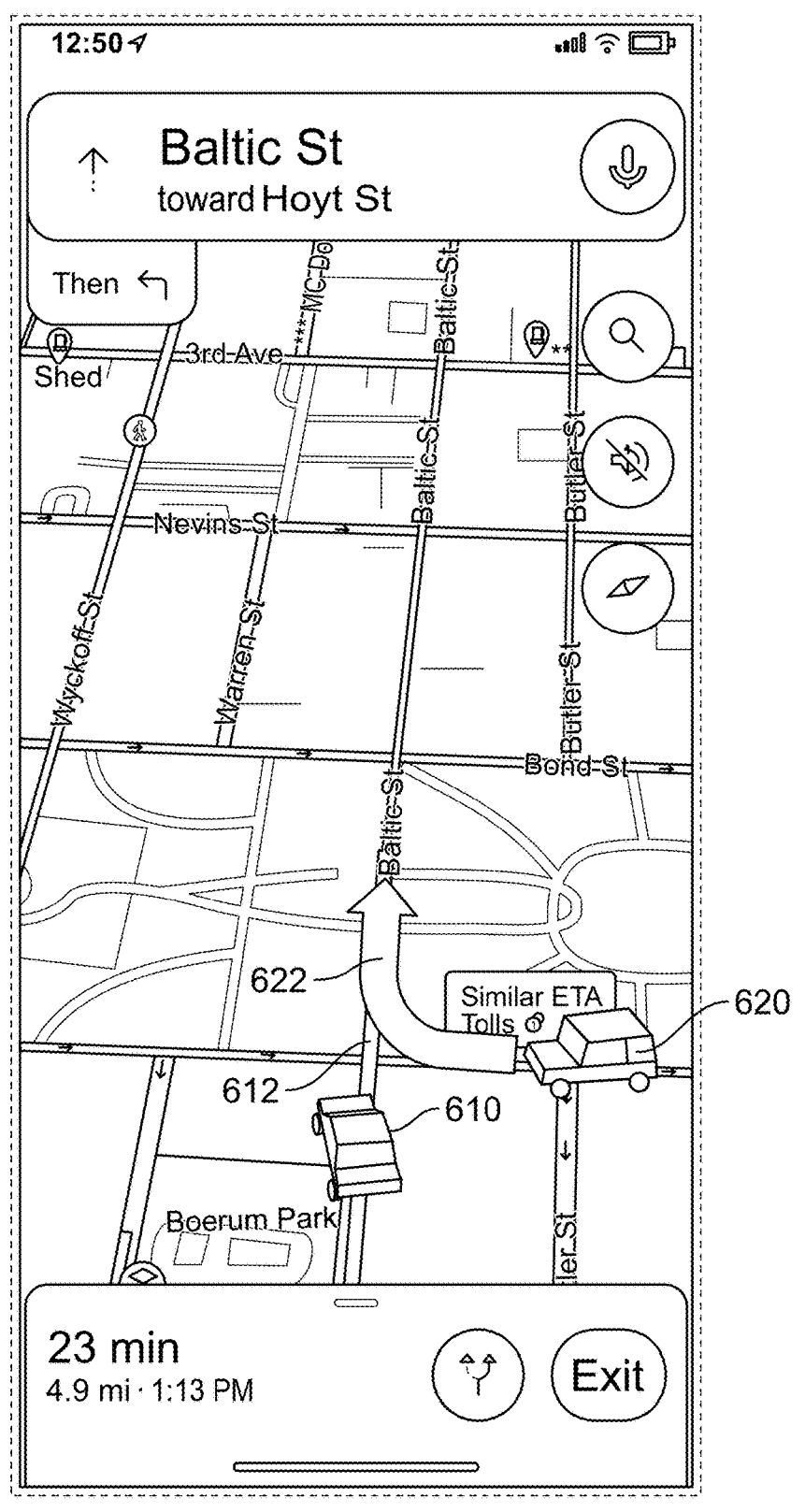
FIG. 6 illustrates an example display showing a first vehicle and a nearby vehicle, along with the nearby vehicle's predicted next navigational instruction, in accordance with some examples of the disclosure.

FIG. 6 illustrates an example display 600 showing a first vehicle 610 and its corresponding navigational path 612, along with a nearby vehicle 620 and its corresponding next navigational instruction 622. In some examples, nearby vehicles (e.g., 620) that are about to get on the same road as the first vehicle 610 may be rendered or presented on a display of the first vehicle 610. For instance, FIG. 6 shows a vehicle 620 that is not currently on the same road as the first vehicle 610, but is approaching the road on which the first vehicle is travelling. Since the next navigational instruction of the nearby vehicle 620 is to join the path of the first vehicle 610, the navigation server may determine that the nearby vehicle 620 is relevant to the first vehicle 610, and may automatically share the nearby vehicle 620's next navigational step with the first vehicle 610.

Note that in some examples, information about nearby vehicle's next navigational steps may only be shared for vehicles that are opting in to having their data shared (e.g., GPS location, next waypoint, etc.). If a nearby vehicle requests that its data not being shared, that nearby vehicle will not be shown on other vehicles' mapping clients.

Additionally, it should be noted that nearby vehicle visualizations and identifications of the next navigational steps may be removed from the display once the location of the nearby vehicle is beyond a threshold, if the nearby vehicle changes directions from the first vehicle (meaning the nearby vehicle is no longer on the same road or going in the same direction as the first vehicle), or if some other condition is met.

Figure 7:
FIG. 7 illustrates an example display showing how a first vehicle and nearby vehicles may be visualized, in accordance with some examples of the disclosure.

FIG. 7 illustrates an example display 700 showing how a first vehicle and nearby vehicles may be visualized, in accordance with some examples of the disclosure. The display 700 may be presented to a user of the first vehicle, and the information used to generate the display may come from data captured by one or more vehicle sensors, such as those described with respect to FIG. 2. In some examples, the first vehicle may use integrated cameras to detect and visualize other vehicles, road vectors and even pedestrians, bicyclists and other VRUs (vulnerable road users). Such visualizations may be very detailed and may even provide enough info to figure out make, model, color, and/or other identifying information of neighboring vehicles. Moreover, in some examples, vehicle operators may enter their vehicle make, model, color, or other identifying information. This information may be shared with other vehicles and/or with the navigation server, in order to enable better identification of the vehicle.

Figure 8:
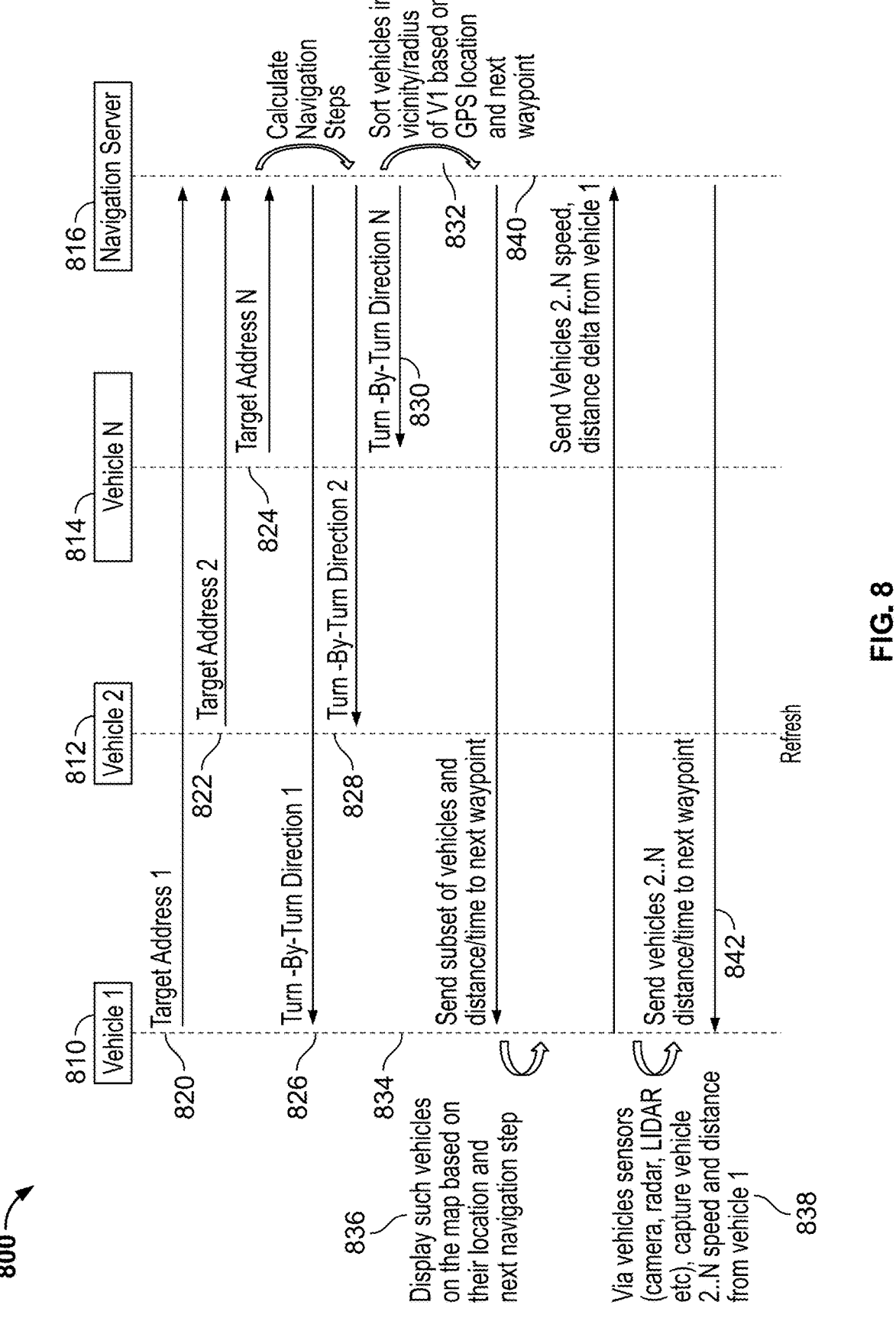
FIG. 8 illustrates an example sequence diagram for requesting and retrieving information about nearby vehicles, in accordance with some examples of the disclosure.

FIG. 8 illustrates an example sequence diagram 800 for requesting and retrieving information about nearby vehicles, in accordance with some examples of the disclosure. The sequence diagram 800 operates for a system that includes a first vehicle 810, a second vehicle 812, an Nth vehicle 814, and a navigation server 816. The system also includes a communication network (not shown) by which the various vehicles and the server communicate.

At steps 820, 822, and 824, each of the first vehicle 810, second vehicle 812, and Nth vehicle 824 transmit their target address or destination to the navigation server 816. The navigation server 816 calculates the navigation steps each vehicle can follow to reach their respective destinations. These steps, which may be referred to as turn-by-turn directions, are then transmitted back to the first vehicle 810, second vehicle 812, and Nth vehicle 814 at steps 826, 828, and 830 respectively.

At step 832, the navigation server may automatically sort the vehicles within a given vicinity, radius, or boundary of the first vehicle based on the respective GPS locations and next navigational steps for each vehicle. The navigation server 816 may determine a subset of vehicles by filtering the vehicles so that only those vehicles relevant to the first vehicle based on location and respective next navigational step are included.

At step 834, the navigation server 816 transmits the next navigation steps of the subset of vehicles to the first vehicle 810. The navigation server 816 may also transmit various other information, such as the expected time at which the next navigation step is expected to occur for each relevant vehicle. At step 836, the first vehicle 810 generates for display on a map (e.g., overlay) the location and next step of the subset of nearby vehicles for which information was provided by the navigation server 816.

In some examples, one or more of the vehicles may request information about the navigational steps of other nearby vehicles. As noted above, the first vehicle may request information about nearby vehicles based on a boundary (e.g., a radius/distance around the first vehicle), can request information about a specific vehicle or subset of vehicles, can request information about vehicles based on a selected next waypoint, or based on some other information. At step 838, the first vehicle 810 captures information about the speed, distance from the first vehicle, and/or other identifying information about the vehicles nearby the first vehicle. As discussed above, the first vehicle may use one or more sensors (e.g., camera, radar, LIDAR, etc.) to gather information about nearby vehicles. Some or all of this information is then transmitted to the navigation server 816 at step 840.

The navigation server then correlates the received information from the first vehicle 810 with the information stored by the navigation server, to determine the subset of vehicles which the first vehicle 810 has collected information about. Then, at step 842, the navigation server identifies the next navigational steps of the subset of vehicles (e.g., next waypoint, distance/time to next waypoint, etc.), and transmits that information back to the first vehicle. The first vehicle 810 then generates for display the information received from the navigation server 816.

Figure 9:
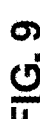
FIG. 9 illustrates an example display showing how a user of a first vehicle may request information about the next navigational instruction for a nearby vehicle by interacting with the display, in accordance with some examples of the disclosure.

FIG. 9 illustrates an example display 900 showing how a user of a first vehicle 910 may request information about the next navigational instruction for a nearby vehicle 920 by interacting with the display, in accordance with some examples of the disclosure. In some examples, the user of the first vehicle 910 may identify the neighboring vehicle 920 by leveraging the first vehicle 910's cameras (or other sensors such as LIDAR, radar, ultrasound etc.). The first vehicle 910 may then transmit a request for information about the nearby vehicle 920 to the navigation server.

While making this inquiry, the first vehicle 910's cameras may capture the speed of the neighboring vehicle 920 and calculate the distance between the first vehicle 910 and the nearby vehicle 920. This information may be transmitted to the navigation server to be used in the filtering process to identify the exact target vehicle about which the first vehicle 910 is requesting information.

Using this method, even vehicles that are not using a navigation system, or are not using the same navigation system as the first vehicle 910 can be identified and visualized at the first vehicle 910, and the navigation server can take their presence into account while estimating time calculations to a waypoint or traffic congestion situations. Even if the next navigational step of the nearby vehicle 920 cannot be determined (e.g., because the nearby vehicle 920 is not using a navigation system, or is not using the same navigation system as the first vehicle), if the speed and distance of the nearby vehicle 920 with respect to the first vehicle 910 can be determined, the presence of the nearby vehicle 920 can be accounted for in making various navigational determinations at the navigation server.

In some examples, rather than selecting a specific nearby vehicle or waypoint, the first vehicle may select a set of vehicles or set of locations by drawing an outline on a map. This may cause the navigation server to perform a directed local search by translating the drawn outline into a set of vehicles or GPS locations that will be used as a query to the navigation server. The navigation server can then use the received information to filter its database and return the information that the first vehicle is requesting. In some examples, the search can also be initiated with a voice interface running a natural language processing (NLP) engine.

In a further example, the first vehicle may initiate a search of all vehicles that have the same next navigational step as the first vehicle, or share an upcoming waypoint navigational move, and only those matching vehicles may be displayed on the first vehicle display.

Figure 10:
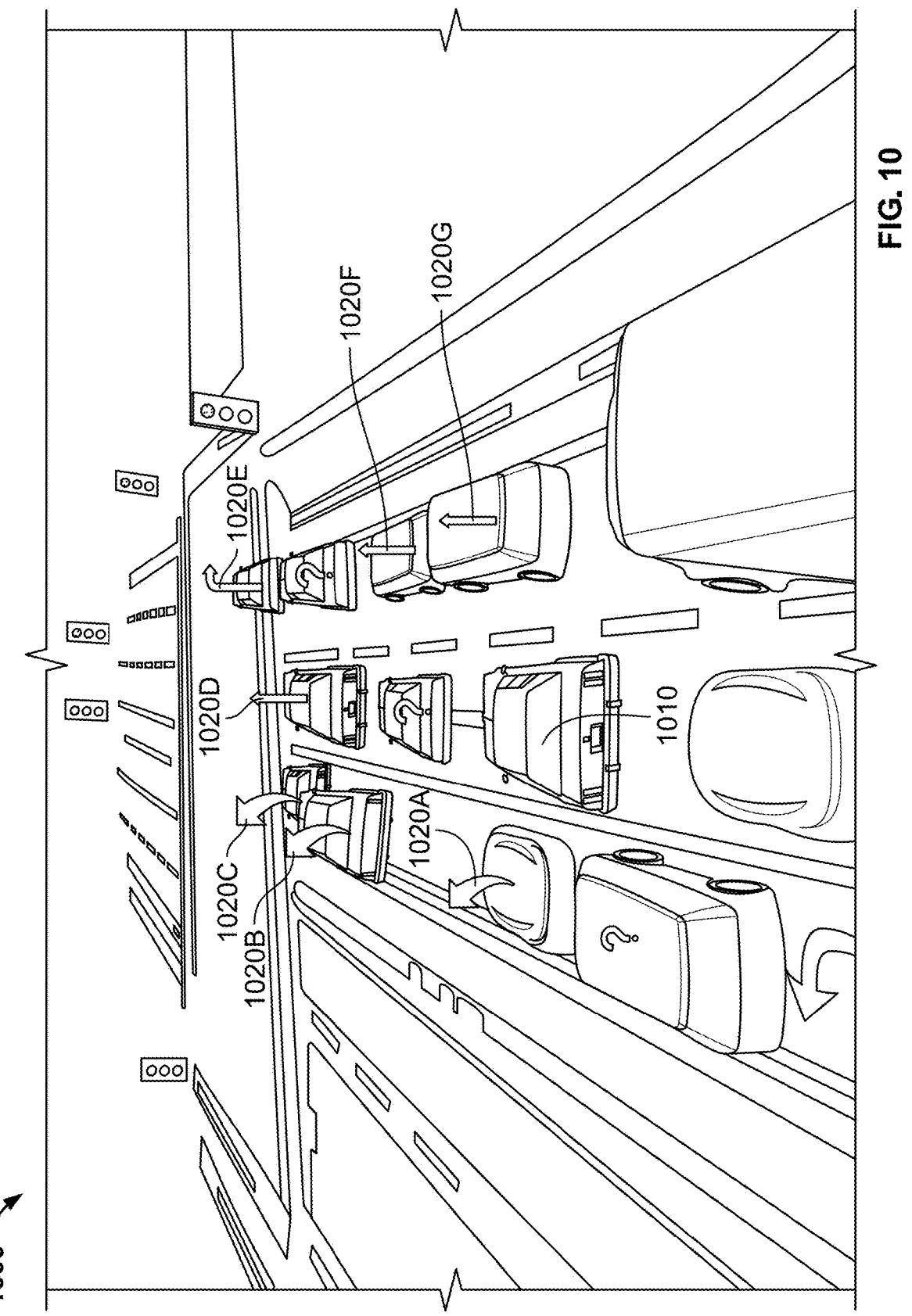
FIG. 10 illustrates an example display of a first vehicle, showing the respective next navigational instruction for each nearby vehicle overlaid on the respective vehicle, in accordance with some examples of the disclosure.

FIG. 10 illustrates an example display 1000 of a first vehicle 1010, showing the respective next navigational instruction for each nearby vehicle overlaid on the respective vehicle, in accordance with some examples of the disclosure. FIG. 10 illustrates a second type of display, which may be different than the displays shown in FIGS. 3-6. In some vehicles, the vehicle may present a display in which the vehicle is positioned in a middle, and nearby vehicles are shown in their respective relative positions, as shown in FIGS. 9 and 10.

In some examples, the navigation server may transmit navigational information (including the next navigational step) about each nearby vehicle or a subset of nearby vehicles that match one or more criteria. As shown in FIG. 10, the first vehicle 1010 may receive the navigational information and may overlay the respective next navigational steps on the corresponding vehicles on the display 1000. This is illustrated in FIG. 10 as the arrows 1020A-G overlaid on the respective nearby vehicles. In some examples, the vehicle may display a "?" or other identifier overlaid on a vehicle if no information is known about that vehicle's next navigational step, if that vehicle opted out of sharing information, if the probability that the vehicle will follow the navigation instructions is below a threshold, or as a default. Alternatively, the display may leave a vehicle blank and may not overlay any indicator.

In some examples, the navigation application generating the display may use a different color, shading, style, or other method or visual distinction for each direction (e.g., left turn in red, right turn in green, etc.). In other example, the navigation application may use different symbols, shading, etc. for each vehicle, one or more sets of vehicles based on their next navigational step, or to distinguish between the nearby vehicles. In some examples, the nearby vehicles themselves may be visually distinguished by color, shading, etc. based on the next navigational step for each nearby vehicle. In some examples, all vehicles that share a next navigational step with the first vehicle 1010 may be displayed to match the first vehicle 1010 (e.g., same color, shading, etc.) or may be displayed to match each other, whereas nearby vehicles that do not share the next navigational step with the first vehicle 1010 are displayed in a different manner (e.g., different color, shading, etc.). This enables the user of the first vehicle 1010 to quickly determine which nearby vehicles share the same next navigational step.

Figure 11:
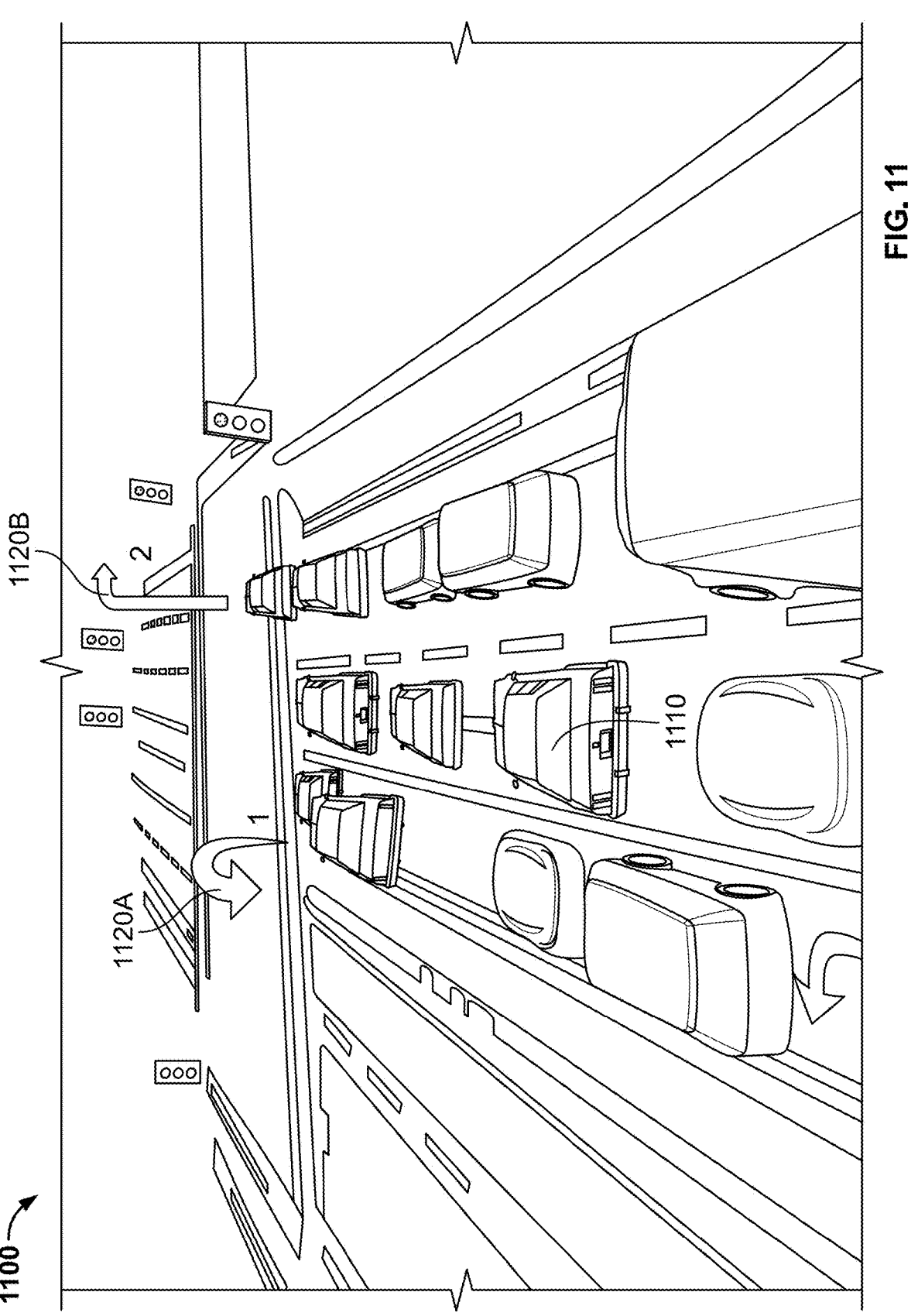
FIG. 11 illustrates an example display of a first vehicle, showing the aggregate number of nearby vehicles predicted to take various next navigational steps, in accordance with some examples of the disclosure.

FIG. 11 illustrates an example display 1100 of a first vehicle 1110, showing the aggregate number of nearby vehicles predicted to take various next navigational steps, in accordance with some examples of the disclosure. In some examples, such as when traffic is congested and there are many neighboring vehicles, only an aggregate count of neighboring vehicles that correspond to a given next waypoint move will be shown. FIG. 11 illustrates this scenario, in which the display of vehicle 1010 illustrates that 1 vehicle is making a U-turn (1120A), and two vehicles are making a right turn (1120B). As shown in FIG. 11, the vehicle may only display a subset of vehicles (due to lack of information, decisions by one or more vehicles to opt out of sharing, etc.).

In some examples, the first vehicle 1110 may query the navigation server to receive and display how many drivers within a given range or boundary are going to take a turn at an upcoming intersection. The display may then include a number or other indicator that corresponds to the resulting number of vehicles that meet the requirements of the query. For example, the first vehicle 1110 may query to determine the next navigational steps of all nearby vehicles, and the display may show the corresponding next turns and number of vehicle (e.g., as shown in FIG. 11). In another example, the first vehicle 1110 may query to determine how many vehicles are going to go through the intersection without turning. In still other examples, the first vehicle 1110 may query to determine how many vehicles share the same next navigational step as the first vehicle 1110. It should be understood that these examples are for illustration only, and that many other queries and combinations of requests and resulting displays of information may be used.

As discussed above, as another filtering step, the navigation server may only provide information about the vehicles in front of the first vehicle 1110 that are driving at a slower speed than the first vehicle 1110 or at the suggested navigation speed may be shown. Vehicles that are faster and ahead of the first vehicle 1110 may never impact the first vehicle because these vehicles will continue to get farther away.

Figures 12A, 12B:
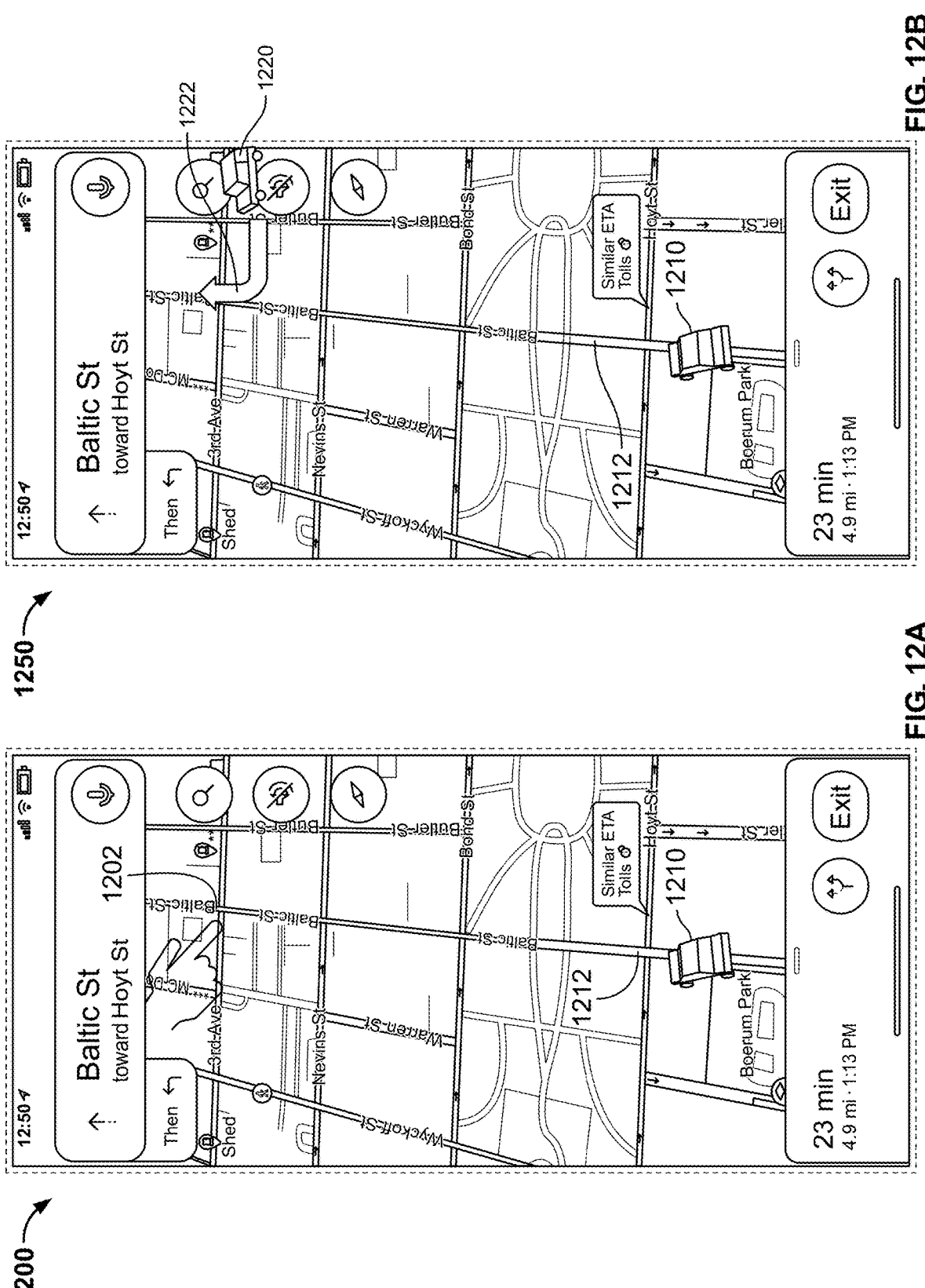
FIGS. 12A-B illustrates example displays showing how a user of a first vehicle may request information about the next navigational instruction for one or more nearby vehicles by selecting a waypoint on the display, in accordance with some examples of the disclosure.

FIGS. 12A-B illustrates example displays showing how a user of a first vehicle may request information about the next navigational instruction for one or more nearby vehicles by selecting a waypoint on the display, in accordance with some examples of the disclosure. The user of a vehicle may select a particular waypoint or location on a map (either within a set boundary or outside the boundary) to initiate a query to the navigation server to find out how many neighboring vehicles are planning to take that navigation step, make that exit, make that turn, or pass through that waypoint. If the navigation server returns a response of no vehicles, the vehicle may make an audible or visual indication to indicate that to the user of the requesting vehicle. Otherwise, the navigation server may return the number, location, and/or other information about nearby vehicles that are predicted to take that selected navigation step, exit, turn, waypoint, etc. This functionality may be useful, for example in a city or dense area, to enable a user to quickly determine whether an alternate route is worth exploring.

FIG. 12A shows a user selecting intersection 1202 on the display 1200 that is not along the current route 1212 of the user's vehicle 1210. The user may request information about whether (or how many) vehicles are expected to pass through the selected intersection 1202. The display 1250 in FIG. 12B illustrates a resulting display after the navigation server returns the relevant information, showing that nearby vehicle 1220 has a next navigation step 1222 that is expected to be a turn onto the road at the selected intersection 1202. The user of the first vehicle 1210 may use this information in planning a route or deviating from the current planned route 1212. In another example, a user travelling on the highway could determine if any nearby vehicles are going to travel for long period of time (e.g., several miles or past several exits) alongside the first vehicle. This may enable the user to make decisions regarding whether to get drive past, behind, caravan, and/or match cruise control speeds with one or more nearby vehicles.

In some examples, the first vehicle may be an autonomous vehicle, and/or may be operable in an autonomous mode in which one or more vehicle functions are performed without user input (e.g., automatic parking, automatic lane change, etc.). Once the nearby vehicle next navigational steps are known to the first vehicle, the first vehicle may leverage this information to adjust its driving behavior. For example, the first vehicle may (a) accelerate to fill an expected gap in traffic that will be left by the nearby vehicle exiting the lane, (b) adjust its inter vehicle distance, (c) adjust its braking distance, (d) adjust its adaptive cruise control settings, (e) adjust a platooning system setting, (f) change lanes to avoid one or more nearby vehicles that are expected to slow down, and more. In some examples, the first vehicle may automatically make a decision to adjust its driving behavior based on the next navigational steps of nearby vehicles. In other examples, the first vehicle may present a proposed vehicle behavior change for approval or authorization, before carrying out the driving behavior change.

In some examples, the first vehicle may have an EZ-Pass or other device or system operable on a toll road system for ease of payment. The vehicle may be configured to present a visualization of the nearby vehicles that have an EZ-pass. The EZ-pass designation can be recorded as part of the vehicle profile within the navigation/mapping client. This profile may be hosted on the vehicle itself as well as can be communicated to the navigation server. In some embodiments, the EZ-Pass designation associated with one or more of the nearby vehicles may provide the first vehicle predictive knowledge of which vehicles (e.g., which of the nearby vehicles in front of the first vehicle) will take the EZ-Pass (as opposed to the cash or non-EZ-pass lanes). One or more vehicles may also or alternatively have a credit card or other payment mechanism associated with the vehicle. This information may be communicated to and/or stored by the navigation server. The navigation server may then be configured to provide predictions to other vehicles (such as the first vehicle) that any given nearby vehicle will take the credit card payment lane vs. the cash lane.

In some examples, vehicles sensors configured to detect vehicle occupancy may provide the navigation server with information about the number of occupants in any given vehicle. This information may be used to predict whether a given vehicle will take the HOV lane or not.

In some examples, the visualizations of the next navigational steps for nearby vehicles may comprise something in addition to or instead of the arrows and numbers described above. For instance, the visualization may include text or instructions (e.g., lane X will open up shortly, car Y in lane X will be exiting shortly, etc.). This additional information may be helpful to a user in adjusting their driving behavior in light of the predicted actions of nearby vehicles.

In some examples, one or more functions or features described herein may be activated via a voice input. For instance, a user of the first vehicle may say "hey google, tell me what that car is going to do," or "hey google, is that blue Ford F-150 going to exit soon?" In response the vehicle sensors may identify the vehicle referenced in the input speech. In the first example, the vehicle sensors may use gaze tracking or gesture tracking to determine where the user was looking or pointing, and then identify the relevant vehicle. In the second example, an external facing camera may use image analysis to identify the blue Ford F-150, and/or its location relative to the first vehicle. The first vehicle may then transmit a query to the navigation server including the identifying information from the vehicle sensors. The navigation server may then return the next navigational step of the identified vehicle, and present the next navigational step to the user (e.g., via a visual display or audio output). In another example, if the user provides sufficient information about the nearby vehicle, the navigation server may be able to identify the nearby vehicle without the help of the vehicle sensors. For instance, if the user inquires with sufficient specificity about a nearby vehicle, the navigation server may narrow the set of possible vehicles down to one vehicle (e.g., based on location, direction of travel, vehicle color, etc.) and provide the requested information to the first vehicle without needing to identify the vehicle using the vehicle sensors of the first vehicle.

In some examples, the navigation application may be configured to have one or more presets or defaults based on predetermined nearby vehicle actions. For example, the navigation application of the vehicle may output a chime any time a certain action is predicted to occur (e.g., when a gap is going to open up in a nearby lane).

In some examples, the navigation application may output an alert when a nearby vehicle takes an action that is not in line with the expected next navigation step. For example, if a nearby vehicle is expected to make a turn at the intersection, the first vehicle sensors may gather data about the nearby vehicle's speed and direction. If the nearby vehicle's speed is not reducing, indicating that the nearby vehicle is not going to make the expected turn, the navigation application may alert the user with a sound or visualization.

In some examples, such as in a congested city or parking lot, it may be beneficial to determine whether a nearby vehicle is parked, in the process of parking, or is about to leave. A first vehicle user may select the nearby vehicle and request information about how long the vehicle has been there, and/or what the next predicted navigational step is. The user of the first vehicle can then determine whether the nearby vehicle is parking or not, so as to make a determination whether to stop and wait for the nearby vehicle or to drive off to find a different parking spot.

In some examples, such as where a nearby vehicle is a rideshare vehicle, it may be beneficial to know whether the nearby vehicle is going to stop to drop off or pick up a customer. The navigation application may automatically determine whether a vehicle is a rideshare vehicle, and use this information along with the navigation instructions or other information relating to the nearby vehicle to determine whether the nearby vehicle is about to pull over to pick up or drop off a customer. This can enable a user of the first vehicle to preemptively change lanes to avoid the nearby vehicle.

In some examples, the features described herein may be part of a navigation application running on the first vehicle or on a related device or system. The navigation application may be always on or may be selectively turned on or off by the user. In some cases, the navigation application may automatically turn on or off based on a density of nearby vehicles, the time of day, day of the week, time of year, location, destination, navigation history of the vehicle, navigation application usage history, or some other consideration.

Figures 13, 14:
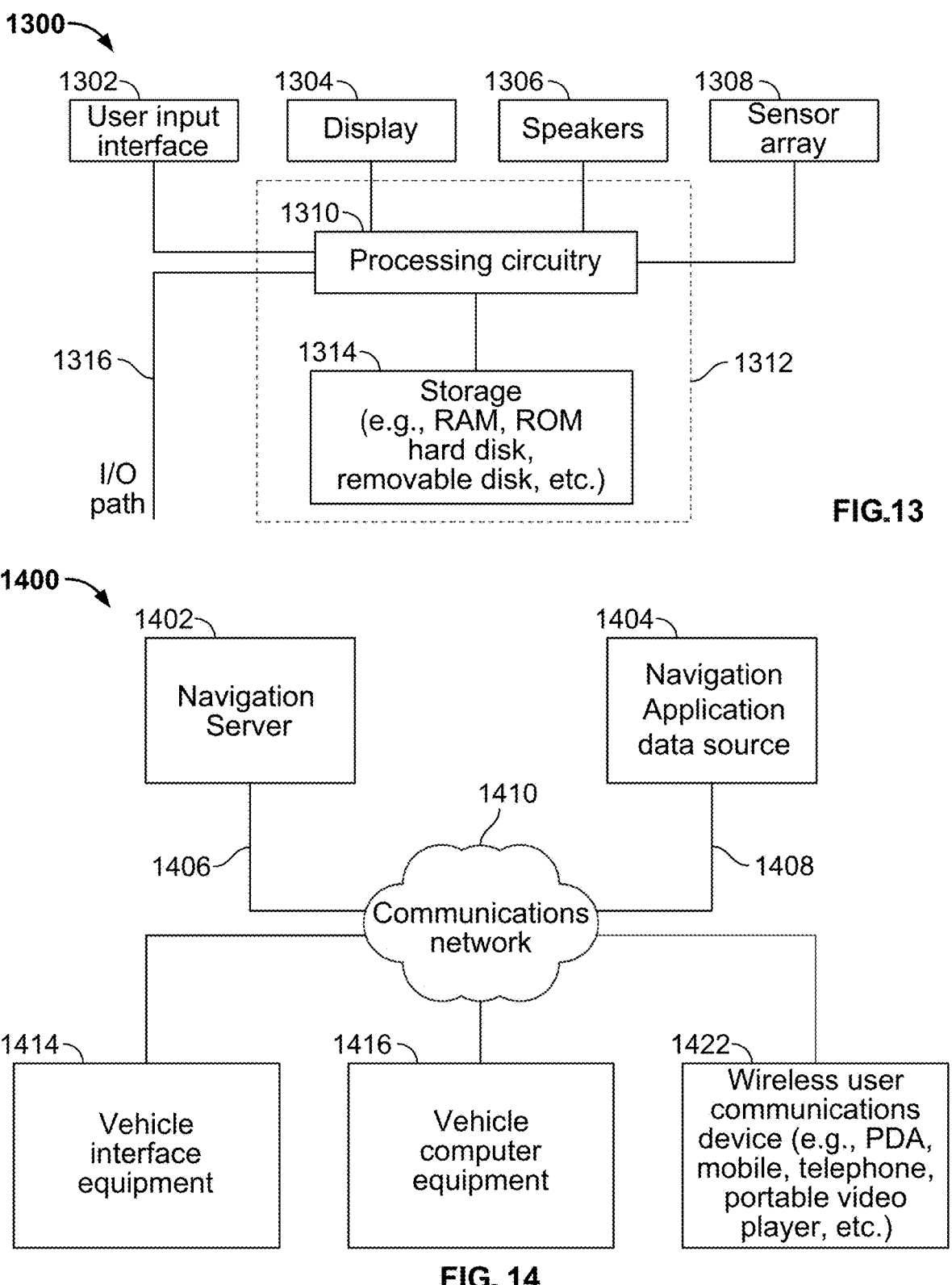
FIGS. 13-14 illustrate example devices, systems, servers, and related hardware for enabling navigational information to be requested and received, in accordance with some examples of the disclosure.

FIG. 13 depicts example devices and related hardware for enabling a navigation application of a first vehicle (e.g., vehicles 110, 310, 410, 460, 510, 610, 810, 910, 1010, 1110, and 1210) to receive navigational information about nearby vehicles, and to present that information to a user, in accordance with some embodiments of the disclosure. FIG. 13 shows a generalized embodiment of illustrative vehicle computing device 1300. Vehicle computing device 1300 may receive data via input/output (I/O) path 1316, and may process input data and output data using input/output circuitry (not shown). I/O path 1316 may provide navigational information (e.g., next navigational steps for one or more nearby vehicles) and data to control circuitry 1312, which includes processing circuitry 1310 and storage 1314. Control circuitry 1312 may be used to send and receive commands, requests, and other suitable data using I/O path 1316.

Control circuitry 1312 may be based on any suitable processing circuitry such as processing circuitry 1310. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 1312 executes instructions for a vehicle navigation application stored in non-volatile memory (i.e., storage 1314). Specifically, control circuitry 1312 may be instructed by the navigation application to perform the functions discussed in this disclosure. For example, the navigation application may provide instructions to control circuitry 1312 to communicate with a navigation server, retrieve sensor data from the vehicle sensor array 1308, and/or to provide information via the vehicle user interface 1302. In some implementations, any action performed by control circuitry 1312 may be based on instructions received from the navigation application.

In client/server-based embodiments, control circuitry 1312 may include communications circuitry suitable for communicating with an application server, navigation server, and/or other networks or servers. The instructions for carrying out the above-mentioned functionality may be stored on the application server. Communications circuitry may include SATCOM, a 5G or 6G modem, a cable modem, an integrated-services digital network (ISDN) modem, a digital subscriber line (DSL) modem, a telephone modem, Ethernet card, a wireless modem, and/or one or more CAN busses or Ethernet transceivers for communications with other equipment, or any other suitable communications circuitry. Such communications may involve the Internet or any other suitable communications networks or paths (which are described in more detail in connection with FIG. 14). In some embodiments, a sensor array 1308 is provided in the vehicle computing device 1300. The sensor array 1308 may be used for capturing image data, audio data, RF data, and/or any other data described herein regarding occupants of the vehicle and/or identifying information about nearby vehicles, generating various data, and making various determinations and identifications as discussed in this disclosure. The sensor array 1308 may include various sensors, such as those described above with respect to FIG. 2, including one or more cameras, microphones, ultrasonic sensors, RF sensors, LIDAR, and light sensors, for example. The sensor array 1308 may also include sensor circuitry which enables the sensors to operate and receive and transmit data to and from the control circuitry 1312 and various other components of the vehicle computing device 1300. In addition, communications circuitry may include circuitry that enables peer-to-peer communication of user equipment devices, or communication of user equipment devices in locations remote from each other (described in more detail below).

Memory may be an electronic storage device provided as storage 1314 that is part of control circuitry 1312. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1314 may be used to store various types of information described herein as well application data that are described above. Nonvolatile memory may also be used (e.g., to launch a boot-up routine and other instructions).

Cloud-based storage may be used to supplement storage 1314 or instead of storage 1314.

Control circuitry 1312 may include video generating circuitry and tuning circuitry, such as one or more analog tuners, one or more decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1312 may also include scaler circuitry for upconverting and down-converting content into the preferred output format of the user equipment device 1300. Sensor array 1308 and/or control circuitry 1312 may also include digital-to-analog converter circuitry and analog-to-digital converter circuitry for converting between digital and analog signals. The tuning and encoding circuitry may be used by the vehicle computing device to receive and to display, play, or record content. In some embodiments, the control circuitry may include an HD antenna.

In one embodiment, speakers 1306 may be provided as integrated with other elements of vehicle computing device 1300 or may be stand-alone units. The audio and other content displayed on display 1304 may be played through speakers 1306. In some embodiments, the audio may be distributed to a receiver (not shown), which processes and outputs the audio via speakers 1306.

In some embodiments, the sensor array 1308 is provided in the vehicle computing device 1300. The sensor array 1308 may be used to monitor, identify, and/or determine identifying information about nearby vehicles. For example, the vehicle interface application may receive image data from the sensor array (e.g., cameras) that are used to identify nearby vehicles.

The navigation application may be implemented using any suitable architecture. For example, it may be a stand-alone application wholly implemented on vehicle computing device 1300. In such an approach, instructions of the navigation application are stored locally (e.g., in storage 1314), and data for use by the navigation application is downloaded on a periodic basis (e.g., from an out-of-band feed, from an Internet resource, or using another suitable approach). Control circuitry 1312 may retrieve instructions of the application from storage 1314 and process the instructions to carry out any of the functions discussed herein. Based on the processed instructions, control circuitry 1312 may determine what action to perform when input is received from input interface 1302. For example, the movement of a cursor on an audio user interface element may be indicated by the processed instructions when input interface 1302 indicates that a user interface 1302 was selected. In some examples, a vehicle may include multiple electronic control units (ECUs) used in conjunction to achieve one or more functions. For example, the sensor array 1308 may be fitted with its own processing circuitry (similar to processing circuitry 1310) and storage (similar to storage 1314) and may communicate via an input/output path (similar to I/O path 1316) to another processing circuitry and/or storage. Similarly, display 1304 and UI 1302 may be connected to another processing circuitry and/or storage. This architecture enables various components to be separated, and may segregate functions to provide failure separation and redundancy.

In some embodiments, the navigation application is a client/server-based application. Data for use by a thick or thin client implemented on vehicle computing device 1300 is retrieved on-demand by issuing requests to a server remote to the vehicle computing device 1300. In one example of a client/server-based application, control circuitry 1312 runs a web browser that interprets web pages provided by a remote or edge server. For example, the remote server may store the instructions for the application in a storage device. The remote server may process the stored instructions using circuitry (e.g., control circuitry 1312) and carry out one or more of the functions discussed herein. The client device may receive data from the remote server and may also carry out one or more of the functions discussed herein locally on vehicle computing device 1300. This way, the processing of the instructions is performed at least partially remotely by the server while other functions are executed locally on vehicle computing device 1300. Vehicle computing device 1300 may receive inputs from the user or occupant of the vehicle via input interface 1302 and transmit those inputs to the remote server for processing. For example, vehicle computing device 1300 may transmit, via one or more antenna, communication to the remote server, indicating that a user interface element was selected via input interface 1302. The remote server may process instructions in accordance with that input and generate a display of content identifiers associated with the selected user interface element. The generated display is then transmitted to vehicle computing device 1300 for presentation to the user or occupant of the vehicle.

In some embodiments, the navigation application is downloaded and interpreted or otherwise run by an interpreter or virtual machine (run by control circuitry 1312). The navigation application may operate in connection with or as a part of an electronic control unit (ECU) of a vehicle. The ECU may be one of many ECUs of the vehicle, wherein each ECU operates to control a particular set of functions of the vehicle, such as engine controls, power train controls, transmission controls, brake controls, etc. The navigation application may operate in connection with one or more ECUs of the vehicle in order to carry out the functions described herein.

Vehicle computing device 1300 of FIG. 13 can be implemented in system 1400 of FIG. 14 as vehicle interface equipment 1414, vehicle computer equipment 1416, wireless user communications device 1422 or any other type of user equipment. For simplicity, these devices may be referred to herein collectively as interface equipment or interface equipment devices and may be substantially similar to the vehicle computing device described above. Interface equipment devices, on which one or more functions of the interface application described herein may be implemented, may function as stand-alone devices or may be part of a network of devices. Various network configurations of devices may be implemented and are discussed in more detail below.

FIG. 14 depicts example systems, servers, and related hardware for enabling a navigation application to carry out the functions described herein, in accordance with some embodiments of the disclosure. An interface equipment device utilizing at least some of the system features described above in connection with FIG. 14 may not be classified solely as vehicle interface equipment 1414, vehicle computer equipment 1416 (e.g., backend processing equipment), or a wireless user communications device 1422. For example, vehicle interface equipment 1414 may, like some vehicle computer equipment 1416, be Internet-enabled, allowing for access to Internet content, while wireless user computer equipment 1422 may, like some vehicle interface equipment 1414, include a tuner allowing for access to media programming. The navigation application may have the same layout on various types of user equipment or may be tailored to the display capabilities of the interface equipment. For example, on wireless user computer equipment 1416, the navigation application may be provided as a website accessed by a web browser. In another example, the navigation application may be scaled down for wireless user communications devices 1422.

The interface equipment devices may be coupled to communications network 1410. Communications network 1410 may be one or more networks including the Internet, a mobile phone network, mobile voice or data network (e.g., a 4G, 5G, 6G, or LTE network), or other types of communications network or combinations of communications networks.

System 1400 includes navigation server 1402 and navigation application data source 1404 coupled to communications network 1410. Communications with the navigation server 1402 and the data source 1404 may be exchanged over one or more communications paths 1406, 1408, but are shown as a single path in FIG. 14 to avoid overcomplicating the drawing. Although communications between server 1402 and data source 1404 with interface equipment devices 1414, 1416, and 1422 are shown through communications network 1410, in some embodiments, server 1402 and data source 1404 may communicate directly with user equipment devices 1414, 1416, and 1422.

Navigation server 1402 may include one or more types of systems, applications, and services, including intermediate devices or servers. Navigation application data source 1404 may provide content data. Navigation application data may be provided to the interface equipment devices using any suitable approach. In some embodiments, navigation application data from data source 1404 may be provided to the interface equipment using a client/server approach. For example, an interface equipment device may pull data from a server, or a server may present the data to an interface equipment device.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise.

Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

What is claimed is:

1. A method comprising:
determining, by a navigation server, a first vehicle navigating according to first navigational instructions, the navigational instructions comprising one or more navigational steps;
receiving, by the navigation server, from the first vehicle via a communication network, a request for data corresponding to at least one target vehicle proximate to the first vehicle;
identifying, by the navigation server, based at least in part on the request received from the first vehicle, the at least one target vehicle proximate to the first vehicle;
determining, by the navigation server, a plurality of next navigational steps for the at least one target vehicle proximate to the first vehicle, wherein both the first vehicle and the at least one target vehicle are in communication with the navigation server;
providing, to the first vehicle via the communication network, an immediate next navigational step of the plurality of next navigational steps for the at least one target vehicle proximate to the first vehicle;
causing to be provided via a user interface associated with the first vehicle, an indication of the immediate next navigational step of the plurality of next navigational steps for the at least one target vehicle; and
causing the first vehicle to adjust a driving behavior based on the immediate next navigational step for the at least one target vehicle.

2. The method of claim 1, wherein identifying the at least one target vehicle proximate to the first vehicle comprises:
determining, by the navigation server, a location of the first vehicle;
determining, by the navigation server, a set of vehicles that are (a) within a first distance of the location of the first vehicle and (b) travelling in the same direction as the first vehicle; and
selecting, by the navigation server, the set of vehicles as the at least one target vehicle.

3. The method of claim 1, wherein identifying the at least one target vehicle further comprises:
determining, by the navigation server, an immediate next navigational step for the first vehicle;

determining, by the navigation server, a set of vehicles that have the same immediate next navigational step as the first vehicle; and
selecting, by the navigation server, the set of vehicles as the at least one target vehicle.

4. The method of claim 3, wherein the indication of the immediate next navigational step for each of the at least one target vehicle comprises an arrow overlaid on a map, wherein the method further comprises:
generating, by the navigation server, for presentation via the user interface corresponding to the first vehicle, visual indicators for each of the at least one target vehicles.

5. The method of claim 1, wherein identifying the at least one target vehicle comprises:
receiving, from the first vehicle via the communication network, sensor data captured by a sensor of the first vehicle and corresponding to a set of vehicles proximate to the first vehicle;
identifying, by the navigation server, the set of vehicles based on the sensor data captured by the first vehicle; and
selecting, by the navigation server, as the at least one target vehicle, the identified set of vehicles.

6. The method of claim 1, wherein the indication of the immediate next navigational step for the at least one target vehicle comprises a visual identification of the immediate next navigational step for the at least one target vehicle, and wherein the visual identification comprises, for each respective target vehicle of the at least one target vehicle a respective arrow overlaid on a map in a position corresponding to the respective target vehicle.

7. The method of claim 1, wherein the indication of the immediate next navigational step for the at least one target vehicle comprises a visual identification of the immediate next navigational step for the at least one target vehicle, the method further comprising:
causing to be provided via the user interface associated with the first vehicle, for each respective target vehicle of the at least one target vehicle, a line overlaid on a map extending from a current location of the respective target vehicle to a next expected turn of the respective target vehicle.

8. The method of claim 1, wherein the indication of the immediate next navigational step for the at least one target vehicle comprises a visual identification of the immediate next navigational step for the at least one target vehicle, the method further comprising, for each respective target vehicle of the at least one target vehicle:
removing the visual identification of the immediate next navigational step in response to the respective target vehicle travelling beyond a threshold distance from the first vehicle.

9. The method of claim 1, further comprising:
receiving, via the communication network, a query from the first vehicle, the query corresponding to a second vehicle;
identifying, by the navigation server, the second vehicle based on sensor data from a sensor of the first vehicle;
determining, by the navigation server, an immediate next navigational step of the second vehicle; and
transmitting, via the communication network, the immediate next navigational step of the second vehicle to the first vehicle.

10. The method of claim 1, wherein the first vehicle is operable in an autonomous mode, the method further comprising:

modifying a speed of the first vehicle based on the immediate next navigational step for the at least one target vehicle.

11. The method of claim 1, wherein the first vehicle is operable in an autonomous mode, the method further comprising:

modifying one or more of an inter-vehicle distance, braking distance, cruise control setting, or lane position of the first vehicle based on the immediate next navigational step for the at least one target vehicle.

12. The method of claim 1, further comprising:

determining, by the navigation server, a probability that the at least one target vehicle is likely to follow the immediate next navigational step based on a navigation history of the at least one target vehicle; and in response to determining that the probability is greater than a threshold:

providing, to the first vehicle via the communication network, the immediate next navigational step for the at least one target vehicle proximate to the first vehicle; and causing to be provided via the user interface associated with the first vehicle, the indication of the immediate next navigational step for the at least one target vehicle.

13. A system comprising:

control circuitry configured to:

determine, by a navigation server, a first vehicle navigating according to first navigational instructions, the navigational instructions comprising one or more navigational steps;

receive, by the navigation server, from the first vehicle via a communication network, a request for data corresponding to at least one target vehicle proximate to the first vehicle;

identify, by the navigation server based at least in part on the request received from the first vehicle, the at least one target vehicle proximate to the first vehicle; and determine, by the navigation server, a plurality of next navigational steps for the at least one target vehicle proximate to the first vehicle, wherein both the first vehicle and the at least one target vehicle are in communication with the navigation server; and input/output circuitry configured to:

provide, to the first vehicle via the communication network, an immediate next navigational step of the plurality of next navigational steps for the at least one target vehicle proximate to the first vehicle;

cause to be provided via a user interface associated with the first vehicle, an indication of the immediate next navigational step of the plurality of next navigational steps for the at least one target vehicle; and cause the first vehicle to adjust a driving behavior based on the immediate next navigational step for the at least one target vehicle.

14. The system of claim 13, wherein the control circuitry is further configured to identify the at least one target vehicle proximate to the first vehicle by:

determining, by the navigation server, a location of the first vehicle;

determining, by the navigation server, a set of vehicles that are (a) within a first distance of the location of the first vehicle and (b) travelling in the same direction as the first vehicle; and selecting, by the navigation server, the set of vehicles as the at least one target vehicle.

15. The system of claim 13, wherein the control circuitry is further configured to identify the at least one target vehicle by:

determining, by the navigation server, an immediate next navigational step for the first vehicle;

determining, by the navigation server, a set of vehicles that have the same immediate next navigational step as the first vehicle; and selecting, by the navigation server, the set of vehicles as the at least one target vehicle.

16. The system of claim 15, wherein the indication of the immediate next navigational step for each of the at least one target vehicle comprises an arrow overlaid on a map, wherein the input/output circuitry is further configured to:

generate, by the navigation server, for presentation via the user interface corresponding to the first vehicle, visual indicators for each of the at least one target vehicles.

17. The system of claim 13, wherein the control circuitry is further configured to identify the at least one target vehicle by:

receiving, from the first vehicle via the communication network, sensor data captured by a sensor of the first vehicle and corresponding to a set of vehicles proximate to the first vehicle;

identifying, by the navigation server, the set of vehicles based on the sensor data captured by the first vehicle; and selecting, by the navigation server, as the at least one target vehicle, the identified set of vehicles.

18. The system of claim 13, wherein the indication of the immediate next navigational step for the at least one target vehicle comprises a visual identification of the immediate next navigational step for the at least one target vehicle, and wherein the visual identification comprises, for each respective target vehicle of the at least one target vehicle a respective arrow overlaid on a map in a position corresponding to the respective target vehicle.

19. The system of claim 13, wherein the indication of the immediate next navigational step for the at least one target vehicle comprises a visual identification of the immediate next navigational step for the at least one target vehicle, and wherein the input/output circuitry is further configured to:

cause to be provided via the user interface associated with the first vehicle, for each respective target vehicle of the at least one target vehicle, a line overlaid on a map extending from a current location of the respective target vehicle to a next expected turn of the respective target vehicle.

20. The system of claim 13, wherein the indication of the immediate next navigational step for the at least one target vehicle comprises a visual identification of the immediate next navigational step for the at least one target vehicle, and wherein the input/output circuitry is further configured to, for each respective target vehicle of the at least one target vehicle:

cause to be removed the visual identification of the immediate next navigational step in response to the respective target vehicle travelling beyond a threshold distance from the first vehicle.

* * * * *